US012245984B2

(12) United States Patent
Hung et al.

(10) Patent No.: US 12,245,984 B2
(45) **Date of Patent: *Mar. 11, 2025**

(54) AUTOMATIC PIPE CLEAN SYSTEM FOR MASSAGE BATH EQUIPMENT

(71) Applicant: Dartpoint Tech. Co. ,Ltd., Taipei (TW)

(72) Inventors: Hsien-Peng Hung, Chiayi (TW); Chi-Lin Kang, New Taipei (TW); Chao-Yuan Huang, Taipei (TW)

(73) Assignee: DARTPOINT TECH. CO., LTD., Taipei (TW)

( * ) Notice: Subject to any disclaimer, the term of this patent is extended or adjusted under 35 U.S.C. 154(b) by 825 days.

This patent is subject to a terminal disclaimer.

(21) Appl. No.: 17/358,090

(22) Filed: Jun. 25, 2021

(65) Prior Publication Data

US 2021/0315770 A1 Oct. 14, 2021

Related U.S. Application Data

(63) Continuation of application No. 15/939,416, filed on Mar. 29, 2018, now Pat. No. 11,083,667.

(60) Provisional application No. 62/479,679, filed on Mar. 31, 2017.

(51) Int. Cl.

| | |
|---|---|
| ***A61H 33/00*** | (2006.01) |
| ***B08B 9/032*** | (2006.01) |
| ***E03C 1/304*** | (2006.01) |

(52) U.S. Cl.

CPC ..... *A61H 33/0087* (2013.01); *A61H 33/6068* (2013.01); *B08B 9/0323* (2013.01); *B08B 9/0325* (2013.01); *B08B 9/0328* (2013.01); *A61H 2033/0012* (2013.01); *A61H 2033/002* (2013.01); *E03C 1/304* (2013.01)

(58) Field of Classification Search

CPC ............ A61H 33/0087; A61H 33/6068; A61H 2033/0012; A61H 2033/002; B08B 9/0323; B08B 9/0325; B08B 9/0328; E03C 1/304; A47K 3/001; A47K 3/02

USPC ............................................................ 4/541.5

See application file for complete search history.

(56) References Cited

U.S. PATENT DOCUMENTS 4,954,179 A * 9/1990 Franninge ............... E03C 1/304 134/25.4
D338,710 S * 8/1993 Higginbotham ............. D23/277
D349,561 S * 8/1994 Dowse ......................... D23/277
(Continued)

FOREIGN PATENT DOCUMENTS

CA 3144720 A1 * 2/2021 ............. A01H 1/045
CN 110950749 A * 4/2020 ............. A61P 35/00
(Continued)

*Primary Examiner* — Lori L Baker

(74) *Attorney, Agent, or Firm* — BACON & THOMAS, PLLC

(57) ABSTRACT

An automatic pipe clean system for massage bath equipment includes a bathtub, a water-filling pipe, a water-draining pipe, a suction pipe, a pump pipe, a pump connected between the suction pipe and the pump pipe, an automatic water-filling pipe, a water-filling valve and a controller. The controller is configured to: in a cleaning stage: turn on the pump to allow the water to pass and clean the suction pipe and the pump pipe; and in a drying stage: turn on the pump to allow the water to drain out from the suction pipe and the pump pipe; and turn off the pump.

20 Claims, 14 Drawing Sheets

(56) References Cited

U.S. PATENT DOCUMENTS

| | | | | | |
|---|---|---|---|---|---|
| 5,343,575 | A * | 9/1994 | Cartwright | A61G 7/0005 | 4/547 |
| 5,368,651 | A * | 11/1994 | Esser | A61L 2/22 | 134/169 R |
| 5,383,239 | A * | 1/1995 | Mathis | A61H 33/02 | 134/169 C |
| 5,444,879 | A * | 8/1995 | Holtsnider | A61H 33/027 | 137/262 |
| 5,457,825 | A * | 10/1995 | Holtsnider | A61H 33/60 | 137/262 |
| 5,745,933 | A * | 5/1998 | Yu | E03C 1/048 | 4/541.3 |
| 5,848,445 | A * | 12/1998 | Cranz | A47K 3/02 | 4/575.1 |
| 5,898,958 | A * | 5/1999 | Hall | A47K 3/10 | 4/541.4 |
| 6,052,844 | A * | 4/2000 | Walsh | A61H 33/02 | 4/541.3 |
| 6,829,789 | B1 * | 12/2004 | Liang | A61H 35/006 | 4/541.3 |
| 7,219,605 | B2 * | 5/2007 | Nishiyama | B41F 35/00 | 101/424 |
| 8,950,019 | B2 * | 2/2015 | Loberger | E03C 1/057 | 4/619 |
| 8,997,271 | B2 * | 4/2015 | Bayley | A47K 1/04 | 4/638 |
| 9,170,148 | B2 * | 10/2015 | Bayley | G01F 23/363 | |
| 9,267,736 | B2 * | 2/2016 | Bayley | A47K 4/00 | |
| 9,758,953 | B2 * | 9/2017 | Bayley | A61L 9/16 | |
| 9,775,772 | B2 * | 10/2017 | Tempas | A61H 33/6026 | |
| 10,041,236 | B2 * | 8/2018 | Loberger | E03C 1/18 | |
| 10,100,501 | B2 * | 10/2018 | Figurski | A47K 5/12 | |
| 11,015,329 | B2 * | 5/2021 | Loberger | E03C 1/14 | |
| 11,083,342 | B2 * | 8/2021 | Rivera | A61H 1/00 | |
| 11,083,667 | B2 * | 8/2021 | Hung | B08B 9/0328 | |
| 2005/0052334 | A1 * | 3/2005 | Ogino | H01Q 9/30 | 343/866 |

FOREIGN PATENT DOCUMENTS

| | | | | | |
|---|---|---|---|---|---|
| JP | 4954179 | B2 * | 6/2012 | H01Q 1/1271 |
| RU | 2009700 | C1 * | 3/1994 | |

* cited by examiner

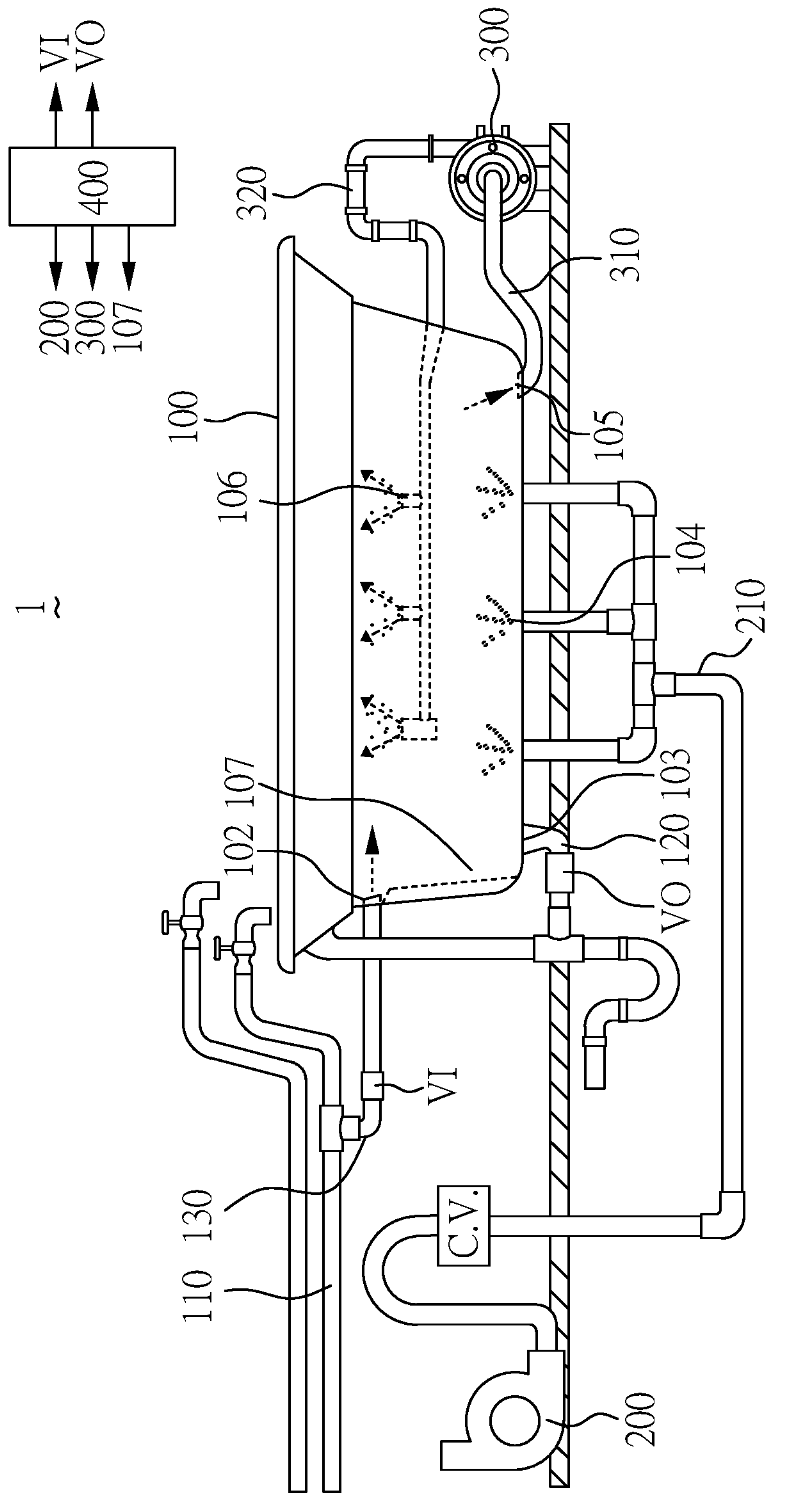
FIG. 2(Type-1)

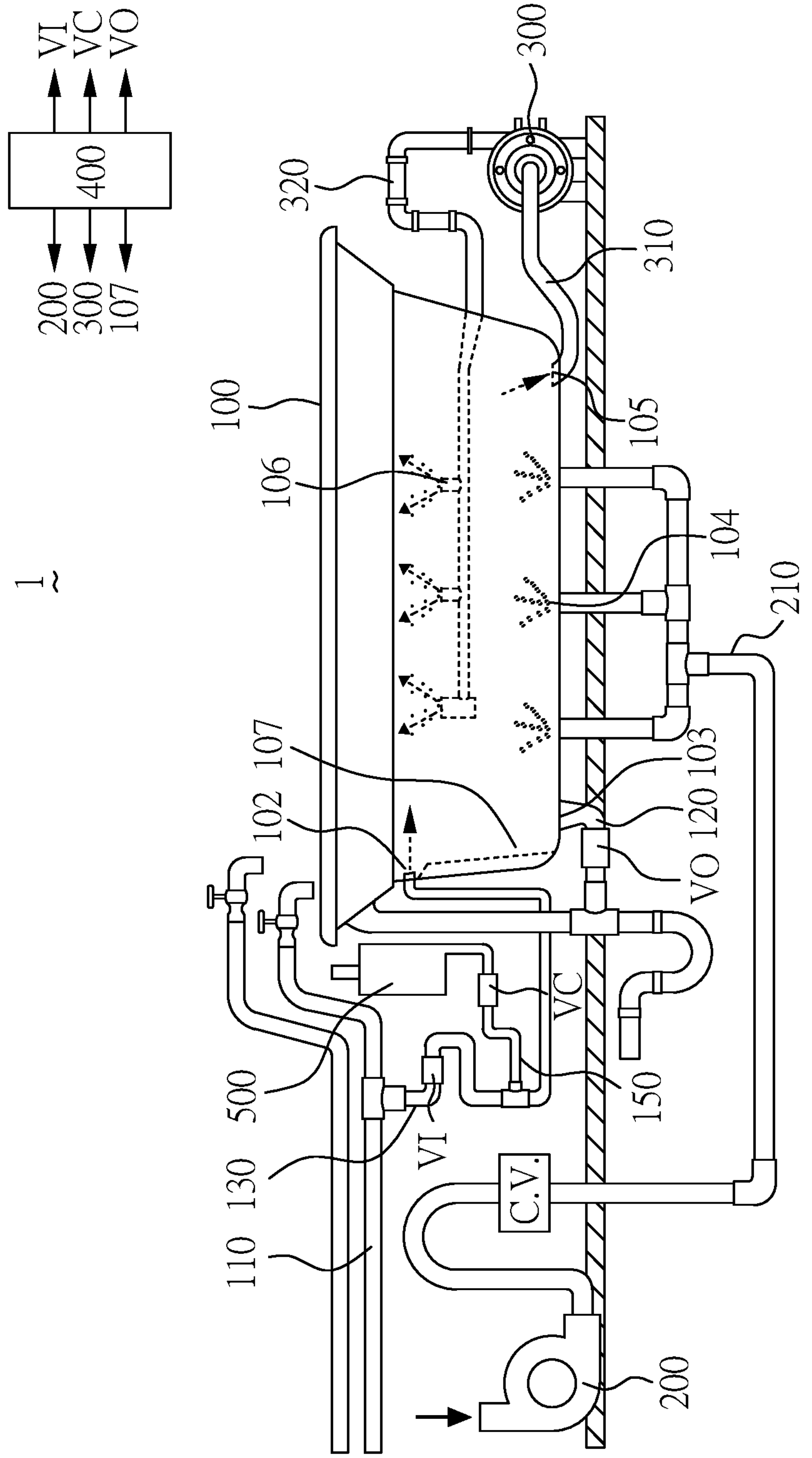
FIG. 3A(Type-2)

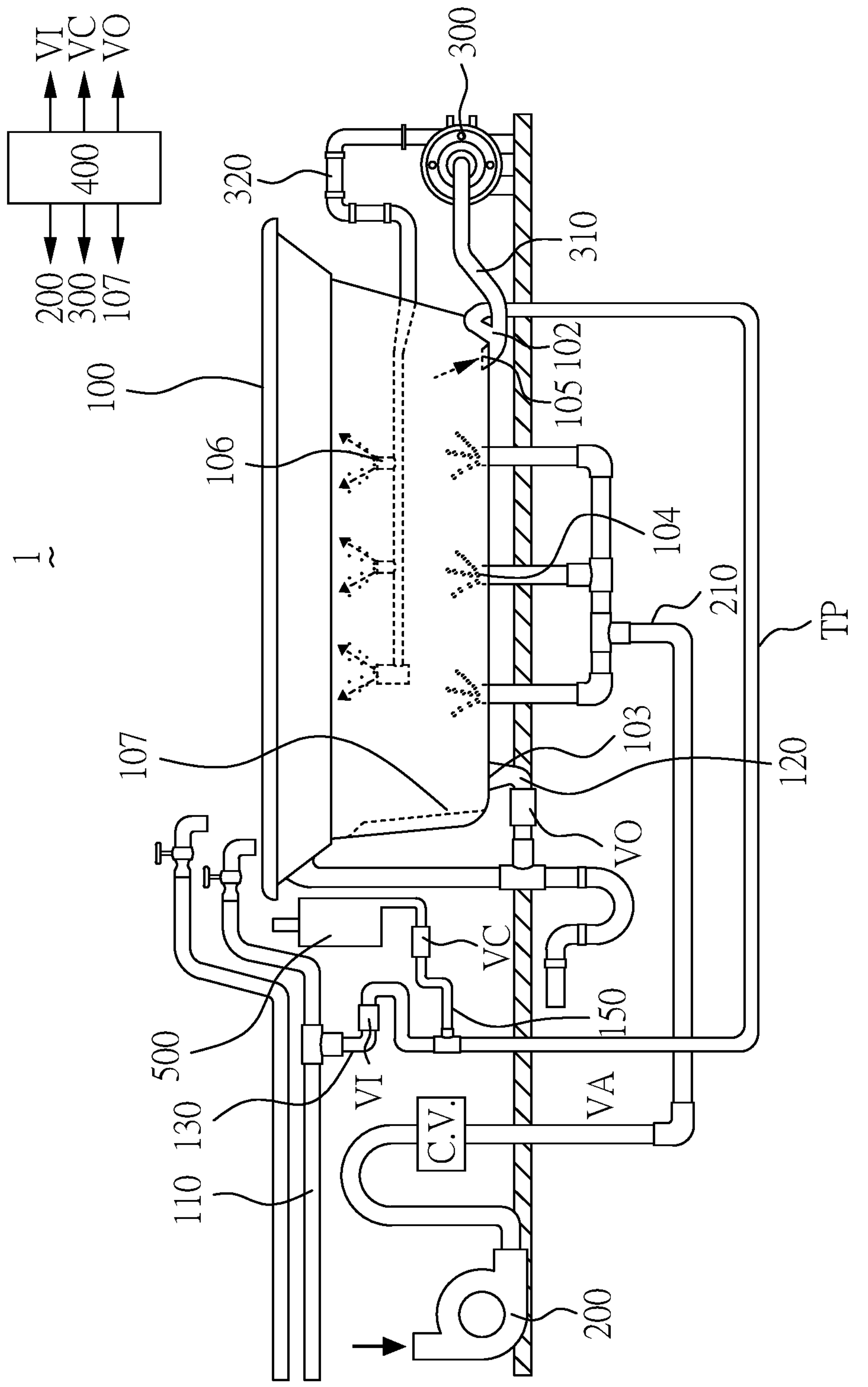
FIG.3B(Type-2 Modification)

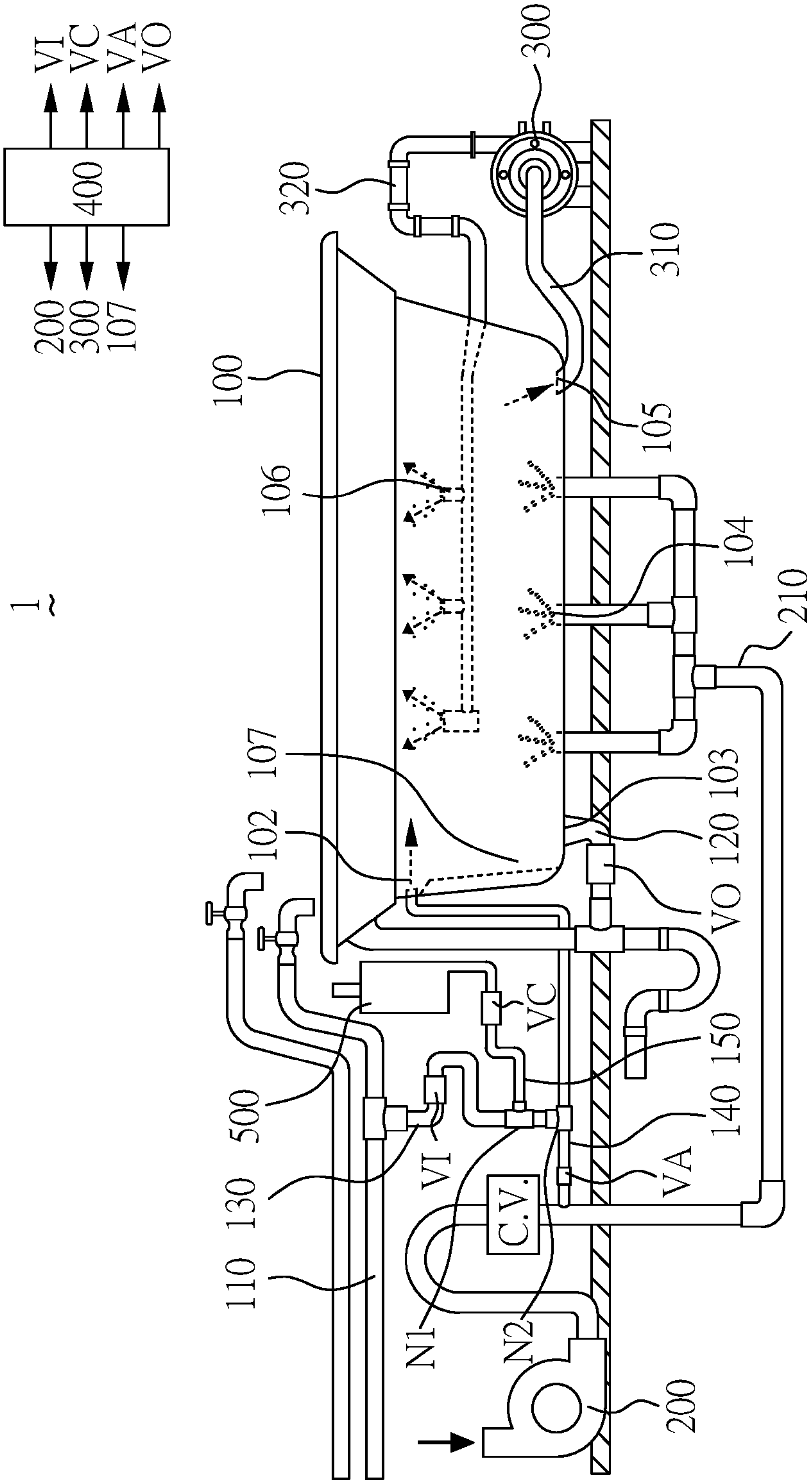
FIG. 4(Type-3)

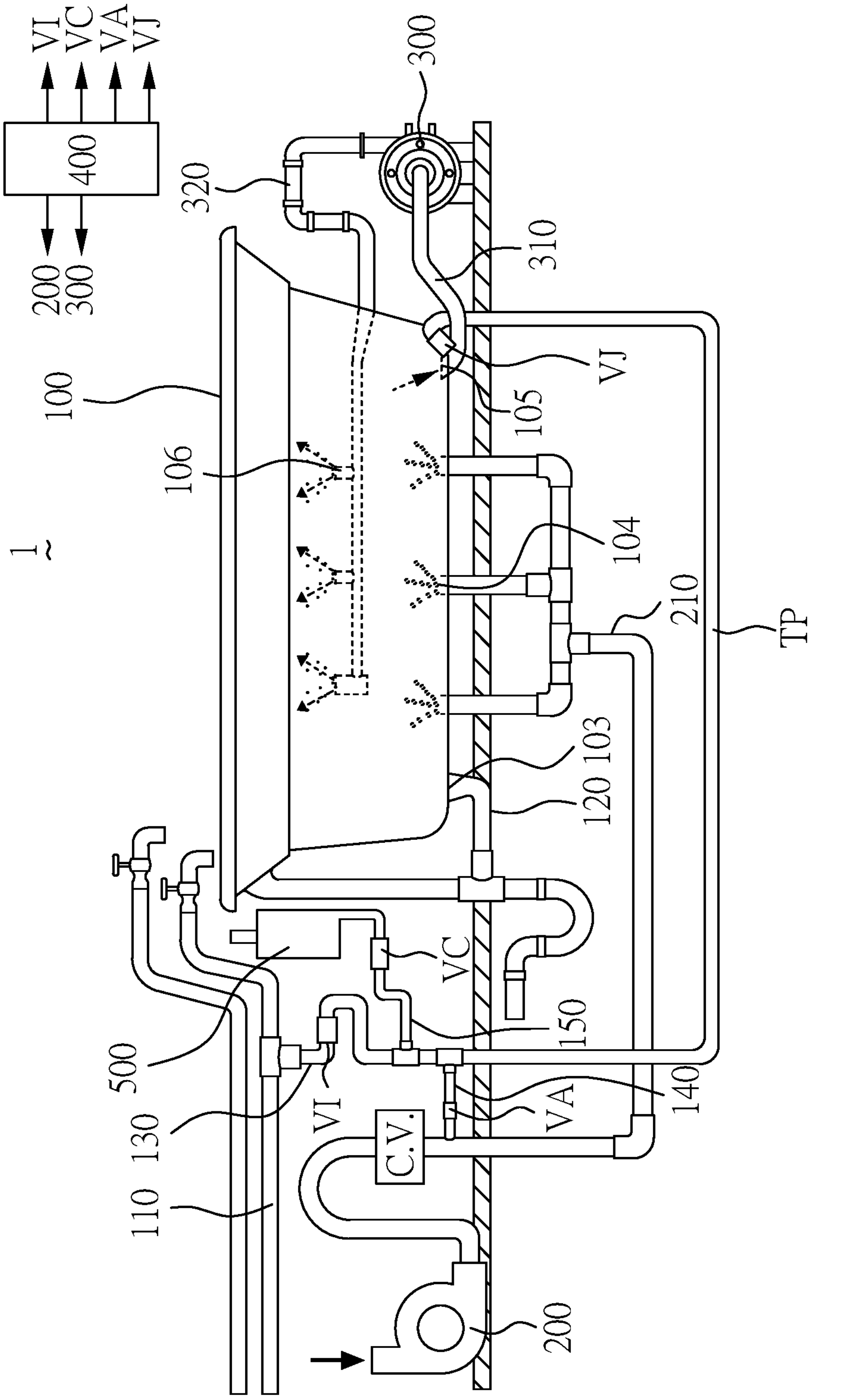
FIG. 5(Type-4)

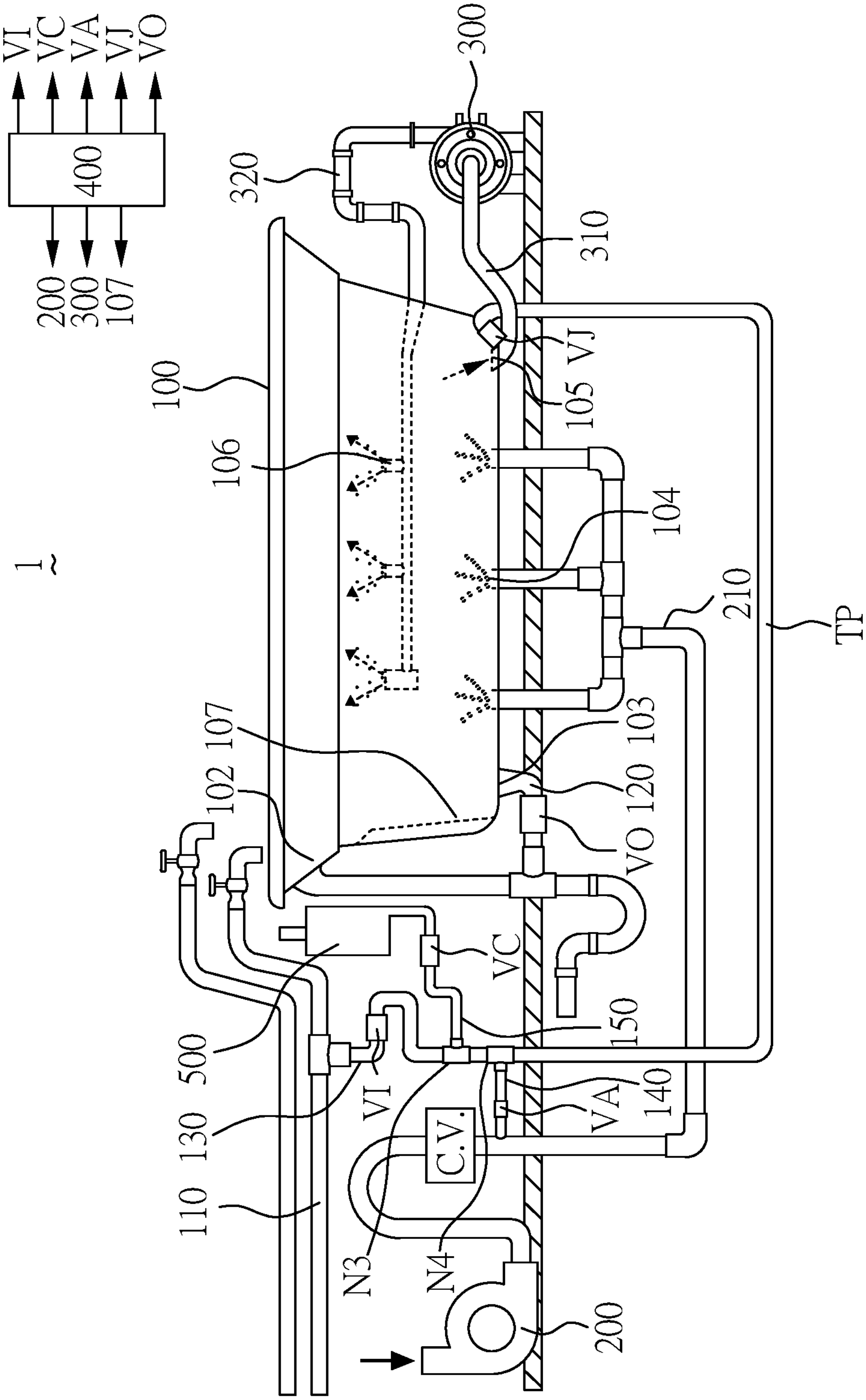
FIG. 6(Type-5)

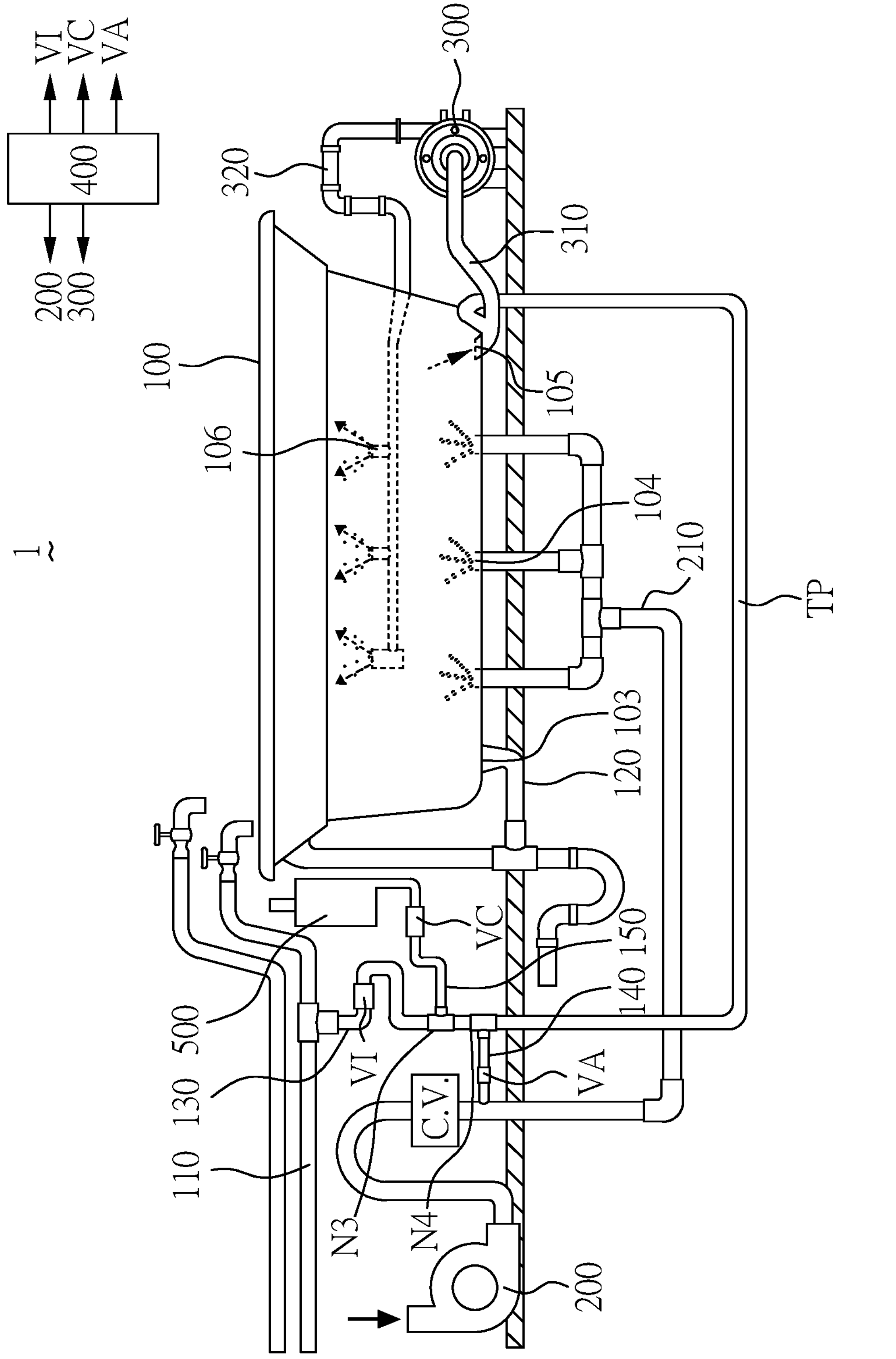
FIG. 7(Type-6-1)

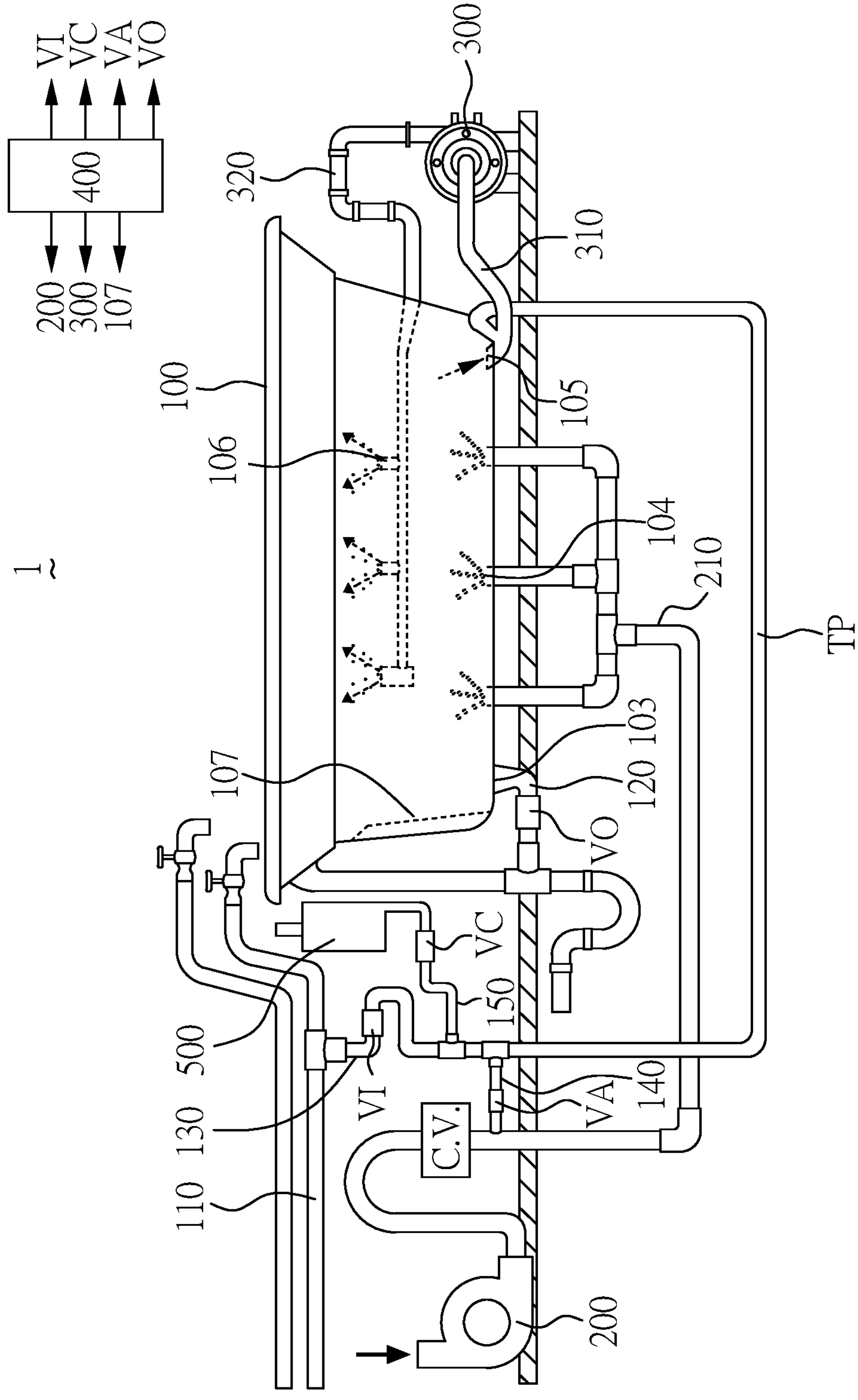
FIG. 8(Type-6-2)

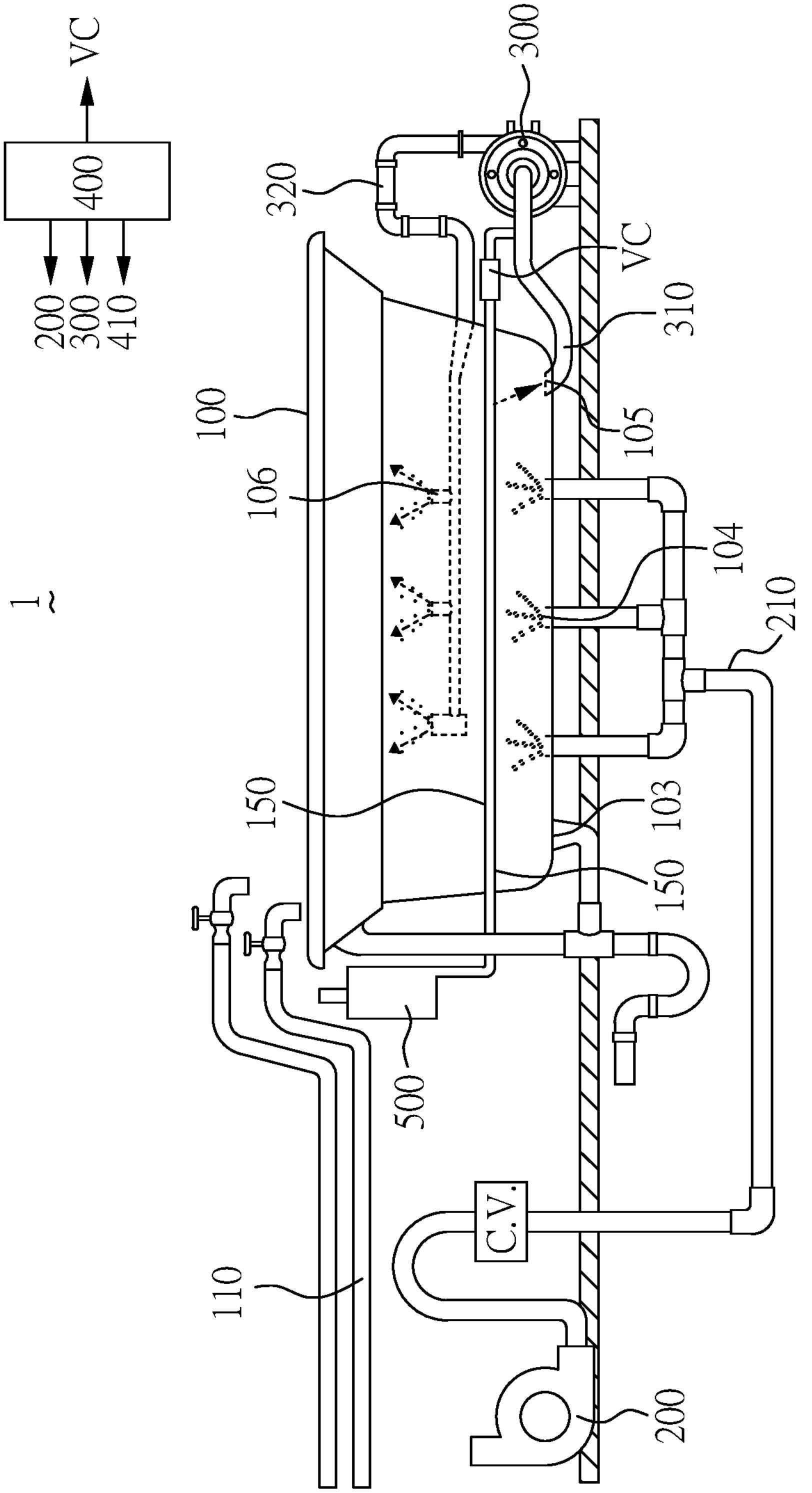
FIG. 9(Type-7-Basic)

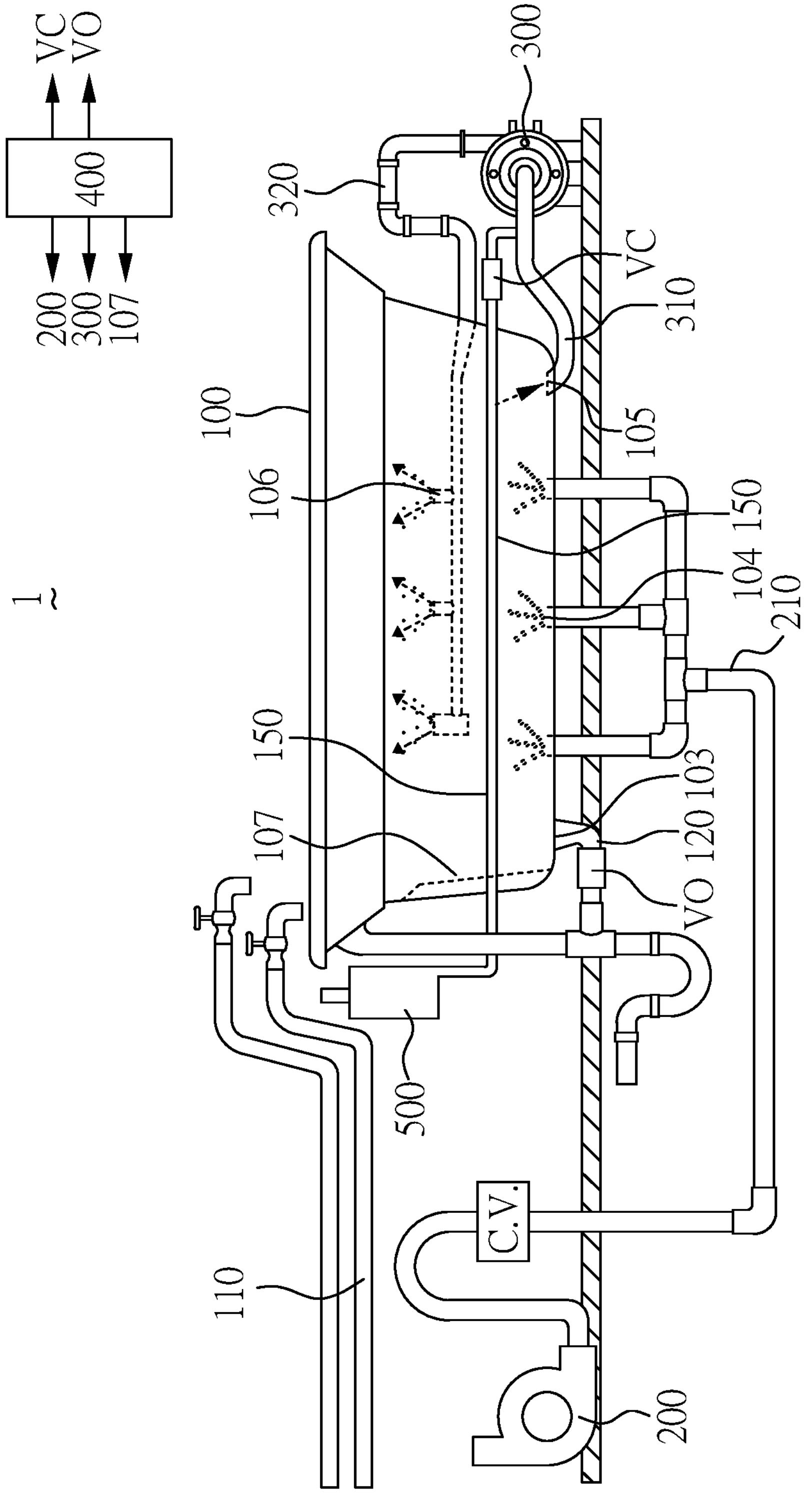
FIG. 11(Type-7-Complete)

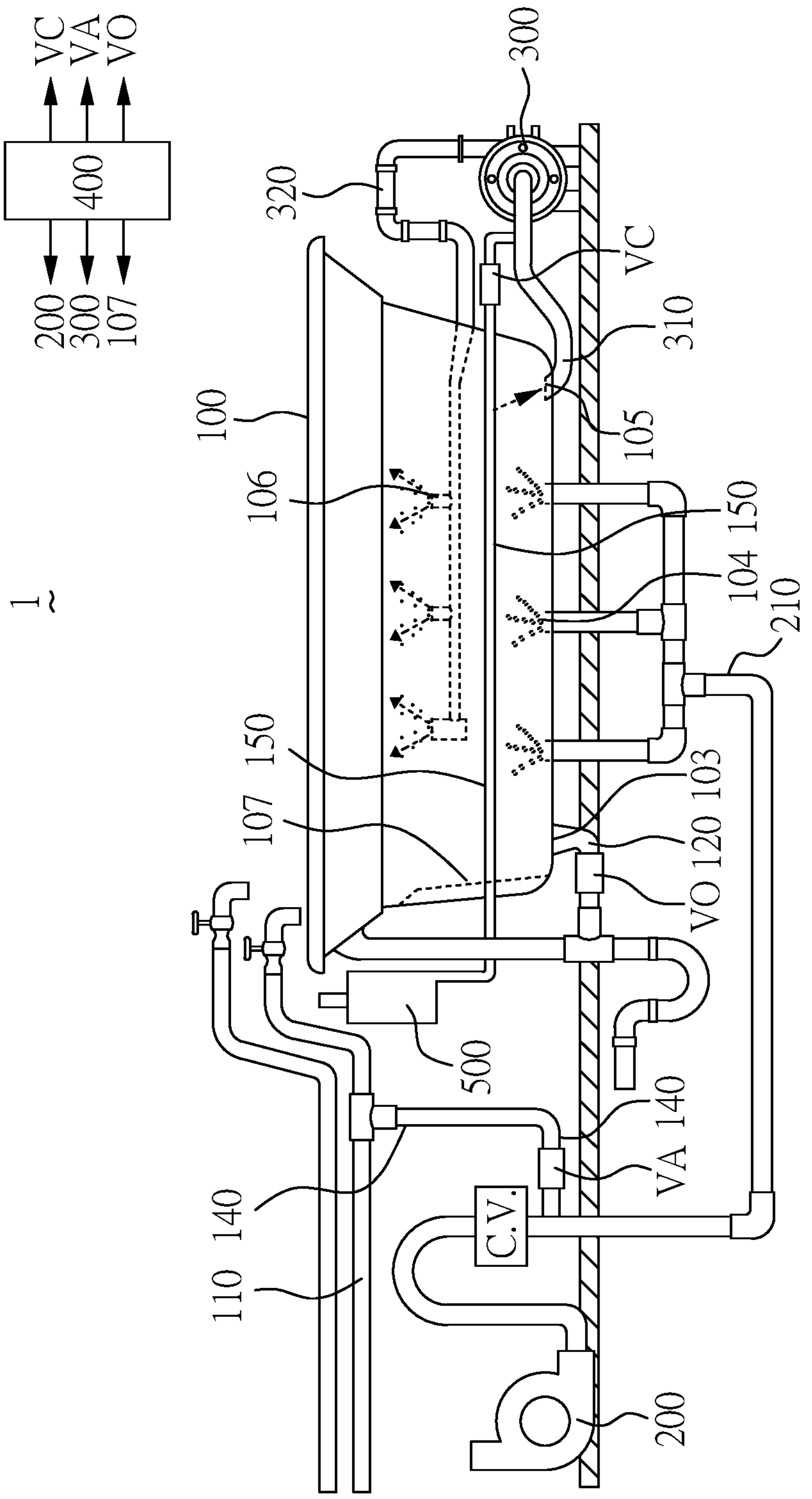
FIG. 12(Type-8)

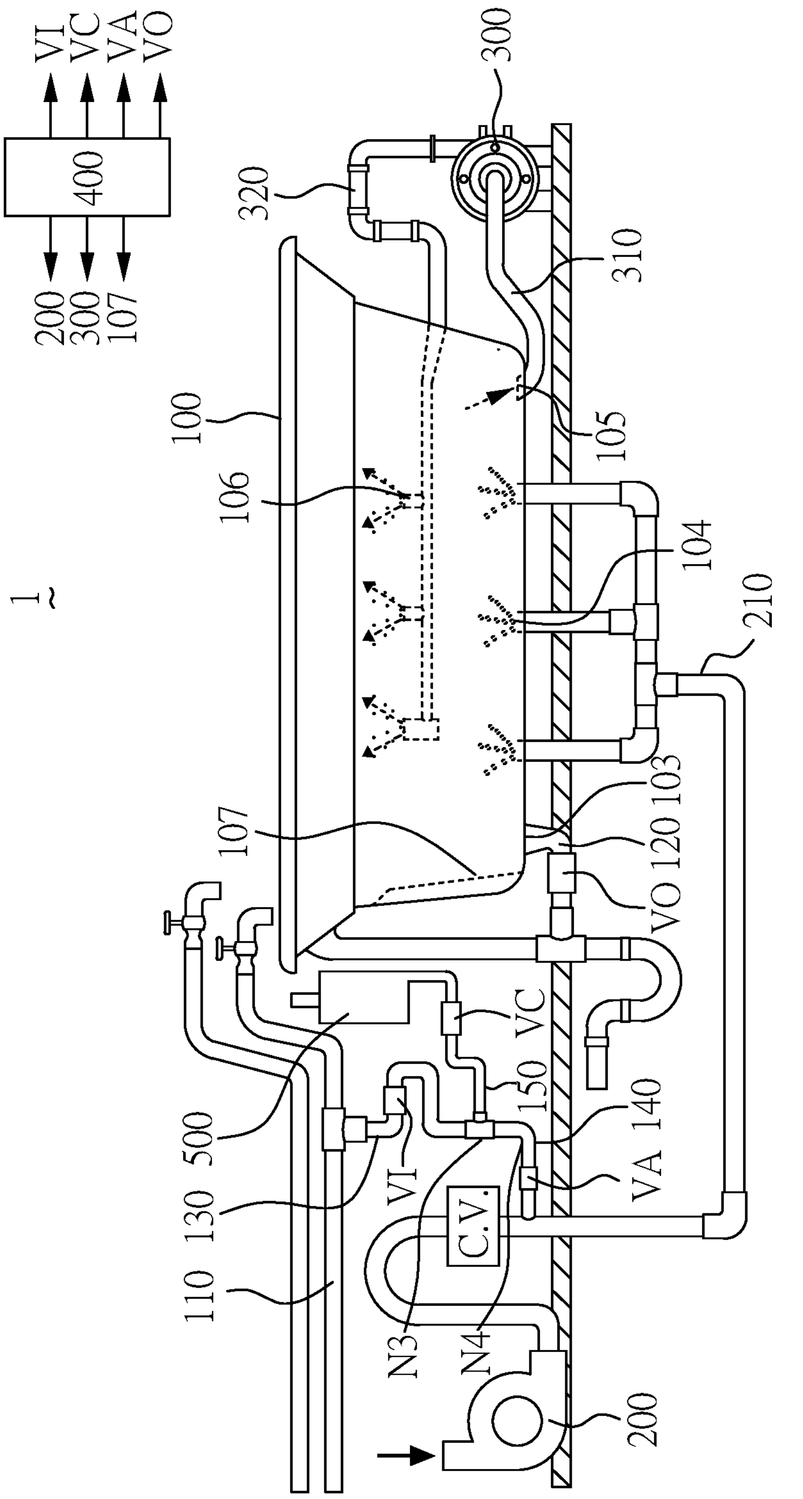
FIG. 13(Type-9)

AUTOMATIC PIPE CLEAN SYSTEM FOR MASSAGE BATH EQUIPMENT

CROSS REFERENCE TO RELATED APPLICATION

This application claims the benefit of filing date of U.S. Provisional Application Ser. No. 62/479,679, entitled "AUTOMATIC PIPE CLEANING SYSTEM AND METHOD FOR MASSAGE BATH EQUIPMENT" filed Mar. 31, 2017 under 35 USC § 119(e)(1).

BACKGROUND OF THE INVENTION

1. Field of the Invention

The present invention relates to a system for bath equipment and, more particularly, to an automatic pipe clean system for massage bath equipment.

2. Description of Related Art

A massage bathtub can be used for a user to take a bath, and it can further be used in massage by producing water jets and bubbles to impact the body of the user. However, some dirt or scum may remain in the bathtub, and even run into its pipes. They may block the pipes and cause damage to them. The dirt and scum may also be detrimental to the hygiene as well. Therefore, the pipes of the massage bathtub have to be cleaned regularly.

The conventional massage bathtubs on the market do not have automatic pipe clean function, and thus must be cleaned manually. Manual cleaning is quiet time-consuming and laborious. The manual cleaning is very inconvenient, because it can only clean the superficial parts of the bathtub and its pipes, but not the deep parts of the pipes. It is even more difficult to clean the buried pipes by manual cleaning.

Therefore, it is desirable to provide an improved massage bathtub which can automatically clean its own pipes in order to maintain its normal working and ensure its hygiene quality.

SUMMARY OF THE INVENTION

The automatic pipe clean system for massage bath equipment of the present invention can be used in several cleaning ways, for example, the original water type, the new water type or the mix type of the two types, categorized by water sources. In particular:

So-called the "original water type" is to perform cleaning with the used bath water. In some cases, a detergent may be put into the original water in the bathtub and then be pumped into the pipes by a pump to perform a circulation, and/or the detergent water may flow into the blower pipe when the blower is turned off, and the detergent water may be blown out from the blower pipe when the blower is turned on.

So-called the "new water type" is to perform cleaning with the new coining water after the used bath water has been drained out. In some cases, the new water may be used to perform flushing without a detergent. While, in some cases, the new water may be mixed with a detergent, and then enter the pipes, wherein the way to enter the pipes is not limited to being pumped into the pipes by a pump.

So-called the "mix type" is to perform cleaning with the used bath water and simultaneously, or late with the new coining water. In some cases, the cleaning may be divided into two stages: a cleaning stage performed with the used bath water at first, and a flushing stage may be performed with the new water without a detergent. A stage may be interpreted as a specific function performed in a specific period.

Besides, the automatic pipe clean system for massage bath equipment of the present invention can be used in several cleaning ways, for example, the water-filling type and the water-spray type, categorized by water routes. In particular:

So-called the "water-filling type" is to put water and/or a detergent in the bathtub at first, and then let the water and/or the detergent flow into the pipes. In some cases, a cleaning circulation may be performed.

So-called the "water-spray type" is to put water and/or a detergent directly in the pipes to be cleaned to perform the cleaning, and then let the water and/or the detergent flow into the bathtub, and then let them drain out from the bathtub.

In the following embodiments:

- The presence of the water-filling valve VI means that the embodiment(s) has an automatic water-filling function. However, in some cases, according to the configuration of the pipes, the water-filling valve VI may work with the blower-pipe valve VA or the suction-pipe valve VJ and direct the water to the blower pipe, or the suction pipe and the pump pipe.
- The presence of the detergent valve VC means that the embodiment(s) has an automatic detergent adding function.
- The presence of the blower-pipe valve VA means that the embodiment(s) can control the cleaning of the internal of the blower pipe, and/or fill the water into the bathtub through the blower-pipe valve VA.
- The presence of the suction-pipe valve VJ means that the embodiment(s) can control the cleaning of the internal of the suction pipe and the pump pipe, and/or fill the water into the bathtub through the pump-pipe valve VJ.
- The presence of the water-draining valve VO means that the embodiment(s) has an automatic water-draining function.

According to a first aspect, the present invention provides an automatic pipe clean system for massage bath equipment, including a bathtub, which includes a water-draining port, a suction port and a water-jet port; a water-filling pipe which supplies water to the bathtub; a water-draining pipe connected to the water-draining port; a suction pipe connected between a pump and the suction port; a pump pipe connected between the pump and the water-jet port; an automatic water-filling pipe which automatically supplies water for cleaning; a water-filling valve arranged in the automatic water-filling pipe; and a controller electrically connected to the pump and the water-filling valve; the controller being configured to: in a cleaning stage: turn on the pump to allow the water to pass and clean the suction pipe and the pump pipe; in a drying stage: turn on the pump to allow the water to drain out from the suction pipe and the pump pipe; and turn off the pump.

The first aspect is mainly applicable to the cleaning way of the new water type.

According to a second aspect, the present invention provides an automatic pipe clean system for massage bath equipment, including a bathtub, which includes a water-draining port, a suction port and a water-jet port; a water-draining pipe connected to the water-draining port; a suction pipe connected between a pump and the suction port; a pump pipe connected between the pump and the water-jet port; a detergent pipe connected between a detergent container with a detergent and the suction pipe; a detergent valve installed on the detergent pipe; and a controller electrically connected to the pump, and the detergent valve, the controller being configured to: in a detergent cleaning stage: turn on the pump for a preset time interval, then turn off the pump; open the detergent valve to allow the detergent to enter the suction pipe from the detergent container, being mixed with a circulating water, then flowing into the bathtub through the pump pipe and the water-jet port; close the detergent valve; turn on the pump to circulate the water in the bathtub to clean the suction pipe and the pump pipe; and drain out the water after the cleaning is complete; wherein the detergent stage is performed at least one time.

The second aspect is mainly applicable to the cleaning way of the original water type.

According to a third aspect, the present invention provides an automatic pipe clean system for massage bath equipment, comprising a bathtub, which includes a water-draining port, an air-jet port, a suction port and a water-jet port; a water-filling pipe which supplies water to the bathtub; a water-draining pipe connected to the water-draining port; a blower pipe connected between a blower and the air-jet port; a suction pipe connected between a pump and the suction port; a pump pipe connected between the pump and the water-jet port; an automatic water-filling pipe connected to a blower-pipe-branch from the water-filling pipe through a water-filling valve and including an upstream node and a downstream node both downstream of the water-filling valve, the blower-pipe-branch connected between the blower pipe and the downstream node of the automatic water-filling pipe; a blower-pipe valve installed on the blower-pipe-branch; a detergent pipe connected between a detergent container and the upstream node of the automatic water-filling pipe; a detergent valve installed on the detergent pipe; a water-draining valve installed on the water-draining pipe; a water level sensor arranged in the bathtub; and a controller electrically connected to the water level sensor, the water-filling valve, the blower-pipe valve, the detergent valve and the water-draining valve, the controller being configured to: in a detergent stage: open the blower-pipe valve and the water-filling valve to allow water to enter the blower-pipe-branch; open the detergent valve to allow the detergent to enter the automatic water-filling pipe from the detergent container through the detergent pipe, being mixed with the water; close the water-filling valve, the blower-pipe valve and the detergent valve; wherein the detergent stage is performed at least one time; in a cleaning stage: turn on the blower to perform an intermittent operation; open the blower-pipe valve and the water-filling valve to allow the water mixed with the detergent pass and clean the blower-pipe-branch and the blower pipe, being mixed with the water in the bathtub; close the water-filling valve; turn on the pump to allow the water mixed with the detergent pass and clean the suction pipe and the pump pipe; turn off the blower and the pump; open the water-draining valve to allow the water to drain out from the bathtub through the water-draining pipe; close the water-draining valve; and in a new water flushing stage: open the water-filling valve and the blower-pipe valve to allow the automatic water-filling pipe supply water to the bathtub through the blower-pipe-branch; detect a water level in the bathtub by the water level sensor, determine: if the water level is equal to or higher than a normal level, then close the water-filling valve and the blower-pipe valve to stop the automatic water-filling pipe from supplying water to the bathtub; turn on the pump to circulate the water in the bathtub; turn on the blower to perform an intermittent operation; turn off the pump and the blower; open the water-draining valve, to allow the water to drain out from the bathtub through the water-draining pipe; and close the water-draining valve; in a drying stage: turn on the pump to allow the water to drain out from the suction pipe and the pump pipe, turn on the blower to blow dry the blower pipe; and turn off the pump and the blower.

The third aspect is mainly applicable to the cleaning way of the mix type.

Other features and advantages of the present invention will become more apparent from the following detailed description when taken in conjunction with the accompanying drawings.

BRIEF DESCRIPTION OF THE DRAWINGS

FIG. 2 shows the automatic pipe clean system for massage bath equipment according to Embodiment Type-1 of the present invention;

FIGS. 3A and 3B show the automatic pipe clean system for massage bath equipment according to Embodiment Type-2 and its modification of the present invention;

FIG. 4 shows the automatic pipe clean system for massage bath equipment according to Embodiment Type-3 of the present invention;

FIG. 5 shows the automatic pipe clean system for massage bath equipment according to Embodiment Type-4 of the present invention;

FIG. 6 shows the automatic pipe clean system for massage bath equipment according to Embodiment Type-5 of the present invention;

FIG. 7 shows automatic pipe clean system for massage bath equipment according to Embodiment Type-6-1 of the present invention;

FIG. 8 shows automatic pipe clean system for massage bath equipment according to Embodiment Type-6-2 of the present invention;

FIG. 9 shows the automatic pipe clean system for massage bath equipment according to Embodiment Type-7-Basic of the present invention;

FIG. 11 shows the automatic pipe clean system for massage bath equipment according to Embodiment Type-7-Complete of the present invention;

FIG. 12 shows the automatic pipe clean system for massage bath equipment according to Embodiment Type-8 of the present invention; and FIG. 13 shows the automatic pipe clean system for massage bath equipment according to Embodiment Type-9 of the present invention.

DETAILED DESCRIPTION OF THE EMBODIMENT

Different embodiments of the present invention are provided in the following description. It is to be understood that the embodiments are not meant to be limiting. Other embodiments can be utilized by arranging, substituting, combining, separating, and designing the features in the present invention.

Figure 1:
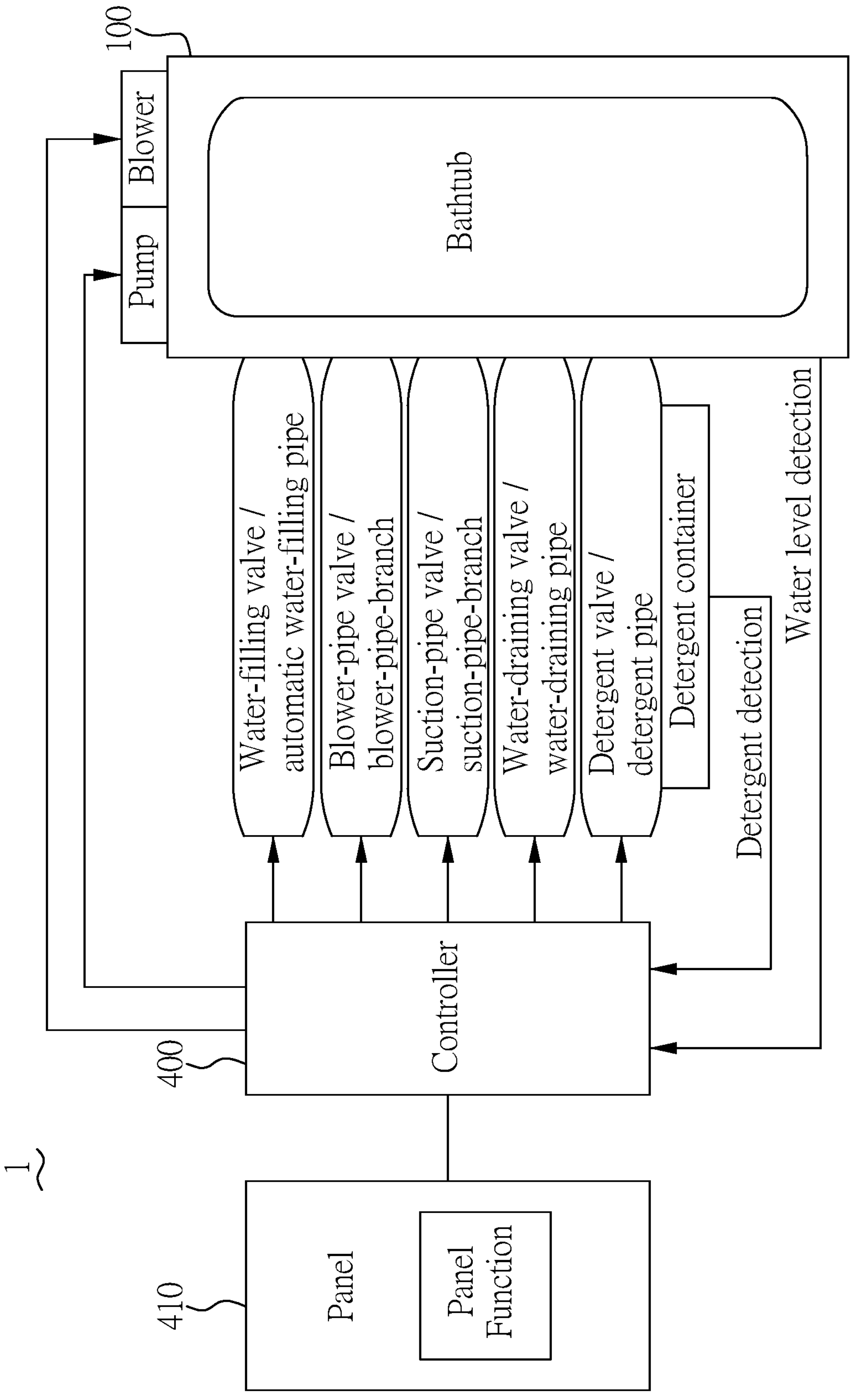
FIG. 1 shows the block diagram of the automatic pipe clean system for massage bath equipment of the present invention.

FIG. 1 shows a system block diagram of the automatic pipe clean system for massage bath equipment 1 ("the present system 1", hereinafter) of the present invention. The present system 1 includes a bathtub 100, a controller 400 and a panel 410.

The bathtub 100 of the present invention works with several basic pipes (which will be discussed in the following description and drawings), including a water-filling pipe, a water-draining pipe, a blower pipe, a suction pipe and a pump pipe, as well as works with several electronically controlled devices (which will be discussed in the following description and drawings), including a blower for air jet, and a pump for water pump. They can produce bubbles and/or water jets to provide the conventional functions of a massage bathtub.

However, some dirt or scum may accumulate in these basic pipes and block them, or be detrimental to the hygiene. Therefore, the present invention provides different embodiments having different auxiliary pipe(s) and device(s) to clean (or flush) these basic pipes.

The different auxiliary pipes may further be installed with different valves, for example, a water-filling valve VI, a detergent valve VC, a blower-pipe valve VA, a suction-pipe valve VJ and a water-draining valve VO. It is noted that, the present system 1 may include one, some or all of the aforementioned valves. The option can be made according to a practical requirement.

The controller 400 is used to control the aforementioned valve(s) to be open or closed. FIG. 1 shows that the controller 400 can control the water-filling valve VI, the detergent valve VC, the blower-pipe valve VA, the suction-pipe valve VJ and the water-draining valve VO, only for example. It does not necessarily means that the controller 400 has to control all of the aforementioned valves. According to a practical requirement, the controller 400 can control one, some or all of the aforementioned valves. The controller 400 can be realized by an integrated circuit (IC) chip, or an electronic device with an IC chip, or a combination with the panel 410, or one part of the panel 410.

The panel 410 is used to operate the controller 400 and display the various data. In particular, in addition to the operations of the conventional functions of the massage bathtub, the panel 410 can further be used to operate the automatic pipe clean functions, for example: cleaning starting, cleaning stopping, cleaning time setting (scheduling), cleaning mode setting and stage circulating times setting, cleaning stage displaying, bathtub water level displaying, detergent volume displaying and output amount controlling. For example, the panel 410 may be a touch panel, or a conventional display panel combined with buttons or a keyboard.

The following description will provide several embodiments to discuss the configuration of the auxiliary pipe(s) and device(s).

Embodiment Type-1

FIG. 2 shows the automatic pipe clean system for massage bath equipment 1 according to Embodiment Type-1 of the present invention. Embodiment Type-1 has functions of automatic water-filling, controlling the internal cleaning of the pump pipe, the suction pipe and the blower pipe, and automatic water-draining. In this embodiment, the detergent has to be put into the water by the user.

The present system 1 structurally includes a bathtub 100, a plurality of peripheral pipes and a plurality of peripheral electronically controlled devices. In particular, the present system 1 includes a bathtub 100 which includes a water-draining port 103, an air-jet port 104, a suction port 105 and a water-jet port 106; a water-filling pipe 110 which supplies water to the bathtub 100; a water-draining pipe 120 connected to the water-draining port 103; a suction pipe 310 connected between a pump 300 and the suction port 105; a pump pipe 320 connected between the pump 300 and the water-jet port 106; an automatic water-filling pipe 130 which automatically supplies water for cleaning; a water-filling valve VI arranged in the automatic water-filling pipe 130; and a controller 400 (of which the electric connection will be discuss later).

Optionally, the present system 1 further includes a blower pipe 210 connected between a blower 200 and an air-jet port 104 of the bathtub 100.

Optionally, the present system 1 further includes a water-draining valve VO installed on the water-draining pipe 120, wherein the automatic water-filling pipe 130 is connected between the water-filling pipe 110 and a water-filling port 102 of the bathtub 100.

Optionally, the present system 1 further includes a water level sensor 107 arranged in the bathtub 100.

Here, the controller 400 is used to control the aforementioned peripheral electronically controlled devices, which is electrically connected to the blower 200, the pump 300, the water level sensor 107, the water-filling valve VI and the water-draining valve VO, and configured to:

In an (early) water-draining stage:

detect the water level of the bathtub 100 by the water level sensor 107; and determine: if the bathtub 100 has water, then open the water-draining valve VO to allow the water-draining pipe 103 to drain out the water from the bathtub 100; if the bathtub 100 has no water, then close the water-draining valve VO to stop the water-draining pipe 103 to drain out the water from the bathtub 100.

Even if the present system 1 is capable of automatic cleaning with new water, it is also possible to ignore the early water-draining stage, and clean with original water, depending on the demand of the user.

In a water-filling stage:

detect a water level of the bathtub 100 by the water level sensor 107; and determine: if the water level is lower than a normal level, then open the water-filling valve VI to allow the automatic water-filling pipe 130 to supply water to the bathtub 100; if the water level is equal to or higher than the normal level, then close the water-filling valve VI to stop the automatic water-filling pipe 130 from supplying water to the bathtub 100.

In a detergent stage:

Mix the water in the bathtub 100 with a detergent. In this embodiment, the detergent has to be put into the water by the user.

In a cleaning stage:

Turn on the pump 300 to allow the water to pass and clean the suction pipe 310 and the pump pipe 320; and turn on and control the blower 200 to perform an intermittent operation to clean the blower pipe 210. So-called the "intermittent operation" is an alternative operation of turning on and turning off. The detergent water may flow into the blower pipe when the blower is turned off, and the detergent water may be blown out from the blower pipe when the blower is turned on. This operation helps the water to be sufficiently mixed with the detergent, and also helps flushing the bathtub and the pipes.

Optionally, in the cleaning stage, the controller 400 is configured to control the pump 300 to perform an intermittent operation.

Perform another (late) water-draining stage, which is similar to the early water-draining stage, in order to drain out the water mixed with the detergent.

In a new water flushing stage after the late water-draining stage after the cleaning stage:

Repeat the water-filling stage, the cleaning stage and the late water-draining stage, while no detergent step is required in the new water flushing stage. We flush the bathtub 100 and the relevant pipes purely with new water.

In a drying stage:

Turn on the pump 300 to allow the water to drain out from the suction pipe 310 and the pump pipe 320; turn on the blower 200 to blow dry the blower pipe 210; and turn off the pump 300 and the blower 200.

Embodiment Type-2

FIGS. 3A and 3B show the automatic pipe clean system for massage bath equipment 1 according to Embodiment Type-2 and its modification of the present invention. The main difference between Embodiments Type-2 and Type-1 is the presence of the relevant devices for automatic detergent adding. Embodiment Type-2 has functions of automatic detergent adding with water-filling, controlling the internal cleaning of the pump pipe, the suction pipe and the blower pipe, and automatic water-draining.

In this embodiment, the automatic water-filling pipe 130 includes a first node N1 downstream of the water-filling valve VI.

In this embodiment, in addition to the devices in embodiment Type-1, the present system 1 further includes a detergent pipe 150 connected between a detergent container with a detergent 500 and the first node N1 of the automatic water-filling pipe 130; and a detergent valve VC installed on the detergent pipe 150 and electrically connected to the controller 400. Wherein the water-filling port 102 is located on one lateral surface of the bathtub 100, as shown in FIG. 3A, or connected onto the suction pipe 310 near the suction port 105, as shown in FIG. 3B, or connected onto the blower pipe 210 near the air-jet port 104.

In this embodiment, and the controller 400 is configured to:

Firstly, perform an early water-draining stage, the way of which may be referred to the aforementioned embodiment(s).

In a detergent stage:

Open the water-filling valve VI and the detergent valve VC to allow the detergent to enter the automatic water-filling pipe 130 from the detergent container 500 through the detergent pipe 150, being mixed with the water; and close the water-filling valve VI and the detergent valve VC; wherein the detergent stage is performed at least one time.

Optionally, if the detergent stage is performed more than one time, the detergent is added at least once in the previous few times.

Optionally, in the aforementioned process, the controller 400 may open the water-filling valve VI for a short time and then close it, so that the automatic water-filling pipe 130 can have a little water, and then open the detergent valve VC for a short time and then close it, so that the detergent can be mixed with the water without the water intruding into the detergent container 500 due to the high pressure of the water.

In a water-filling stage:

Detect a water level of the bathtub 100 by the water level sensor 107; and determine: if the water level is lower than a normal level, then open the water-filling valve VI to allow the automatic water-filling pipe 130 to supply water to the bathtub 100; if the water level is equal to or higher than the normal level, then close the water-filling valve VI to stop the automatic water-filling pipe 130 from supplying water to the bathtub 100.

Next, perform a cleaning stage and a late water-draining stage, the ways of which may be referred to the aforementioned embodiment(s).

In a new water flushing stage after the late water-draining stage after the cleaning stage:

Repeat the water-filling stage, the cleaning stage and the late water-draining stage, while no detergent step is required in the new water flushing stage. We flush the bathtub 100 and the relevant pipes purely with new water.

Finally, perform a drying stage, the way of which may be referred to the aforementioned embodiment(s).

Embodiment Type-3

FIG. 4 shows the automatic pipe clean system for massage bath equipment 1 according to Embodiment Type-3 of the present invention. The main difference between Embodiments Type-3 and Type-2 is the presence of the relevant devices for cleaning the blower pipe 210. Embodiment Type-3 has functions of automatic detergent adding with water-filling, controlling the internal cleaning of the blower pipe, the suction pipe and the pump pipe, and automatic water-draining.

In this embodiment, in addition to the devices in Embodiments Type-1 and Type-2, the present system 1 further includes a blower-pipe valve VA and a blower-pipe-branch 140, wherein the automatic water-filling pipe 130 further includes a second node N2 downstream of the first node N1, the blower-pipe-branch 140 is connected between the blower pipe 210 and the second node N2 of the automatic water-filling pipe 130, the blower-pipe valve VA is installed on the blower-pipe-branch 140 and electrically connected to the controller 400.

In this embodiment, and the controller 400 is configured to:

Firstly, perform an early water-draining stage, the way of which may be referred to the aforementioned embodiment(s).

In a detergent stage:

Open the blower-pipe valve VA, the water-filling valve VI and the detergent valve VC to allow the detergent to enter the automatic water-filling pipe 130 from the detergent container 500 through the detergent pipe 150, being mixed with the water, flowing into the blower pipe 210 and the bathtub; and close the blower-pipe valve VA, the water-filling valve VI and the detergent valve VC; wherein the detergent stage is performed at least one time.

The number of performing of the detergent stage and the solution of the high water pressure problem may be referred to the aforementioned embodiment(s).

In a water-filling stage:

detect a water level of the bathtub 100 by the water level sensor 107; and determine: if the water level is lower than a normal level, then open the blower-pipe valve VA and the water-filling valve VI to allow water to enter the automatic water-filling pipe 130 and the blower pipe 210 and then into the bathtub 100; if the water level is equal to or higher than the normal level, then close the blower-pipe valve VA and the water-filling valve VI to stop the automatic water-filling pipe 130 from supplying water to the bathtub 100.

Next, perform a cleaning stage and late water-draining stage, the way of which may be referred to the aforementioned embodiment(s).

In a new water flushing stage after the late water-draining stage after the cleaning stage:

Repeat the water-filling stage, the cleaning stage and the late water-draining stage, while no detergent step is required in the new water flushing stage. We flush the bathtub 100 and the relevant pipes purely with new water.

Finally, perform a drying stage, the way of which may be referred to the aforementioned embodiment(s).

Embodiment Type-4

FIG. 5 shows the automatic pipe clean system for massage bath equipment 1 according to Embodiment Type-4 of the present invention. The main difference between Embodiments Type-4 and Type-3 is that the water-filling pipe 110 is not directly connected to the bathtub 100, but a suction-pipe-branch TP is added to supply water to the suction pipe 310, and the water-draining valve VO and the water level sensor 107 are both removed. Embodiment Type-4 has functions of automatic detergent adding for and controlling the internal cleaning of the blower pipe, the suction pipe and the pump pipe.

In this embodiment, the automatic water-filling pipe 130 is connected to a suction-pipe-branch TP from the water-filling pipe 110 through the water-filling valve VI and includes an upstream node N3 and a downstream node N4 both downstream of water-filling valve VI, the suction-pipe-branch TP is connected between the suction pipe and one terminal of the automatic water-filling pipe 130 near the downstream node N4.

In this embodiment, in addition to the devices in embodiment Type-1, the present system 1 further includes a suction-pipe valve VJ installed on the suction-pipe-branch TP and near the suction pipe 310; a detergent pipe 150 connected between a detergent container with a detergent 500 and the upstream node N3 of the automatic water-filling pipe 130; a detergent valve VC installed on the detergent pipe 150; and a blower-pipe-branch 140 connected between a blower pipe 210 and the downstream node N4 of the automatic water-filling pipe 130, and a blower-pipe valve VA installed on the blower-pipe-branch 140.

In this embodiment, the controller 400 is electrically connected to the water-filling valve VI, the suction-pipe valve VJ, the detergent valve VC and the blower-pipe valve VA, and the controller 400 is configured to:

In a detergent stage:

Control the pump 300 to perform an intermittent operation; open the blower-pipe valve VA, the suction-pipe valve VJ, the water-filling valve VI and the detergent valve VC to allow the detergent to enter the automatic water-filling pipe 130 from the detergent container 500 through the detergent pipe 150, being mixed with the water, flowing into the blower pipe 210 and the suction pipe 310; and close the blower-pipe valve VA, the suction-pipe valve VJ, the water-filling valve VI and the detergent valve VC; wherein the detergent stage is performed at least one time.

The number of performing of the detergent stage and the solution of the high water pressure problem may be referred to the aforementioned embodiment(s).

In a cleaning stage:

turn on and control the pump 300 and the blower 200 to perform an intermittent operation; open the blower-pipe valve VA, the suction-pipe valve VJ and the water-filling valve VI to allow the water mixed with the detergent to enter the blower pipe 210, the suction pipe 310 and the pump pipe 320; and turn off the pump 300, the blower 200, and close the blower-pipe valve VA, the suction-pipe valve VJ and the water-filling valve VI.

In a new water flushing stage after the cleaning stage:

Repeat the cleaning stage, while no detergent step is required in the new water flushing stage. We flush the relevant pipes purely with new water.

Finally, perform a drying stage, the way of which may be referred to the aforementioned embodiment(s).

Embodiment Type-5

FIG. 6 shows the automatic pipe clean system for massage bath equipment 1 according to Embodiment Type-5 of the present invention. The main difference between Embodiments Type-5 and Type-4 is that Embodiment Type 5 is provided with a water-draining valve VO for water-draining, a water level sensor 107 for detecting the water level in the bathtub. Embodiment Type-5 is completely automatic for cleaning, and has functions of automatic detergent adding for and controlling the internal cleaning of the pump pipe, the suction pipe and blower pipe, and automatic water-draining.

In this embodiment, in addition to the devices in Embodiments Type-1 and Type-4, the present system 1 further includes a water-draining valve VO installed on the water-draining pipe 120; and a water level sensor 107 arranged in the bathtub 100.

In this embodiment, the controller 400 is electrically connected to the water level sensor 107, the water-draining valve VO, the water-filling valve VI, the suction-pipe valve VJ, the detergent valve VC and the blower-pipe valve VA, and configured to:

In an (early) water-draining stage:

Detect the water level of the bathtub 100 by the water level sensor 107; and determine: if the bathtub 100 has water, then open the water-draining valve VO to allow the water-draining pipe 120 to drain out the water from the bathtub 100; if the bathtub 100 has no water, then close the water-draining valve VO to stop the water-draining pipe 120 from draining out the water from the bathtub 100.

In a detergent stage:

Control the pump 300 to perform an intermittent operation; open the blower-pipe valve VA, the suction-pipe valve VJ, the water-filling valve VI and the detergent valve VC to allow the detergent to enter the automatic water-filling pipe 130 from the detergent container 500 through the detergent pipe 150, being mixed with the water, flowing into the blower pipe 210 and the suction pipe 310; and close the blower-pipe valve VA, the suction-pipe valve VJ, the water-filling valve VI and the detergent valve VC; wherein the detergent stage is performed at least one time.

The number of performing of the detergent stage and the solution of the high water pressure problem may be referred to the aforementioned embodiment(s).

In a water-filling stage:

Detect a water level of the bathtub 100 by the water level sensor 107; and determine: if the water level is lower than a normal level, then open the water-filling valve VI, the blower-pipe valve VA and the suction-pipe valve VJ to allow the automatic water-filling pipe 130 to supply water to the bathtub 100 through the blower pipe 210 and the suction-pipe-branch TP; if the water level is equal to or higher than the normal level, then close the water-filling valve VI, the blower-pipe valve VA and the suction-pipe valve VJ to stop the automatic water-filling pipe 130 from supplying water to the bathtub 100.

In a water-filling type cleaning stage:

Turn on and control the pump 300 to perform an intermittent operation to allow the water to pass and clean the suction pipe 310 and the pump pipe 320; turn on and control the blower 200 to perform an intermittent operation to clean blower pipe 210.

After the cleaning is complete, perform another (late) water-draining stage:

Detect the water level of the bathtub 100 by the water level sensor 107; determine: if the bathtub 100 has water, then open the water-draining valve VO to allow the water-draining pipe 120 to drain out the water from the bathtub 100; and if the bathtub 100 has no water, then close the water-draining valve VO to stop the water-draining pipe 120 to drain out the water from the bathtub 100.

In a new water flushing stage:

Turn on and control the pump 300 and the blower 200 to perform an intermittent operation; open the water-draining valve VO, the blower-pipe valve VA, the suction-pipe valve VJ and the water-filling valve VI to allow new water to enter the blower pipe 210, the suction pipe 310 and the pump pipe 320; and turn off the pump 300, the blower 200, the water-draining valve VO, the blower-pipe valve VA, the suction-pipe valve VJ and the water-filling valve VI. We flush the relevant pipes purely with new water.

Finally, perform a drying stage, the way of which may be referred to the aforementioned embodiment(s).

Embodiment Type-6-1

FIG. 7 shows the automatic pipe clean system for massage bath equipment 1 according to Embodiment Type-6-1 of the present invention. Embodiment Type-6-1 is modified based on Embodiment Type-1, while it may also be referred to Embodiment Type-5. The main difference between Embodiments Type-6-1 and Type-5 is that the absence of the suction-pipe valve VJ and the relevant devices for automatic water-draining. Embodiment Type-6-1 has functions of automatic detergent adding for and controlling the internal cleaning of the blower pipe, the suction pipe and the pump pipe.

In this embodiment, the automatic water-filling pipe 130 is connected to a suction-pipe-branch TP from the water-filling pipe 110 through the water-filling valve VI, and includes an upstream node N3 and a downstream node N4 both downstream of the water-filling valve VI, the suction-pipe-branch TP is connected between the suction pipe 310 and one terminal of the automatic water-filling pipe 130 near the downstream node N4.

In this embodiment, in addition to the devices in Embodiment Type-1, the present system 1 further includes a detergent pipe 150 connected between a detergent container with a detergent 500 and the upstream node N3 of the automatic water-filling pipe 130; a detergent valve VC installed on the detergent pipe 150; a blower-pipe-branch 140 connected between a blower pipe 210 and the downstream node N4 of the automatic water-filling pipe 130, a blower-pipe valve VA installed on the blower-pipe-branch 140.

In this embodiment, the controller 400 is electrically connected to the water-filling valve VI, the detergent valve VC and the blower-pipe valve VA, and configured to:

In a detergent stage:

Open the water-filling valve VI, the detergent valve VC and the blower-pipe valve VA to allow the detergent to enter the automatic water-filling pipe 130 through the detergent pipe 150, being mixed with the water, then flowing into the blower pipe 210 and the suction pipe 310; and close the water-filling valve VI, the detergent valve VC and the blower-pipe valve VA; wherein the detergent stage is performed at least one time.

The number of performing of the detergent stage and the solution of the high water pressure problem may be referred to the aforementioned embodiment(s).

In the cleaning stage:

Open the water-filling valve VI and the blower-pipe valve VA; control the blower 200 and the pump 300 to perform an intermittent operation to allow the water mixed with the detergent to flow into both the blower-pipe-branch 140 and the suction-pipe-branch TP to clean the blower pipe 210, the suction pipe 310 and the pump pipe 320; and turn off the blower 200, the pump 300, and close the water-filling valve VI and the blower-pipe valve VA.

Next, perform a new water flushing stage and a drying stage, the way of which may be referred to the aforementioned embodiment(s).

Embodiment Type-6-2

FIG. 8 shows the automatic pipe clean system for massage bath equipment 1 according to Embodiment Type-6-2 of the present invention. The main difference between Embodiments Type-6-2 and Type-6-1 is the presence of the relevant device(s) for automatic water-draining Embodiment Type-6-2 has functions of automatic detergent adding for and controlling the internal cleaning of the blower pipe, the suction pipe and the pump pipe and automatic water-draining.

In this embodiment, in addition to the devices in embodiments Type-1 and Type-6-1, the present system 1 further includes a water-draining valve VO installed on the water-draining pipe 120 and electrically connected to the controller 400; and a water level sensor 107 arranged in the bathtub 100 and electrically connected to the controller 400.

In this embodiment, and the controller 400 is configured to:

In an (early) water-draining stage before the cleaning stage:

detect the water level of the bathtub 100 by the water level sensor 107; and determine: if the bathtub 100 has water, then open the water-draining valve VO to allow the water-draining pipe to drain out the water from the bathtub 100; if the bathtub 100 has no water, then close the water-draining valve VO to stop the water-draining pipe to drain out the water from the bathtub 100.

Next, perform a detergent stage and cleaning stage, the way of which may be referred to the aforementioned embodiment(s).

In the cleaning stage:

Open the water-draining valve VO simultaneously with or earlier/later than the water-filling valve VI and the blower-pipe valve VA.

After the cleaning stage:

Close the water-draining valve VO simultaneously with or after the closing of the water-filling valve VI and the blower-pipe valve VA.

Next, perform another (late) water-draining stage and a drying stage, the way of which may be referred to the aforementioned embodiment(s).

Embodiment Type-7-Basic

FIG. 9 shows the automatic pipe clean system for massage bath equipment 1 according to Embodiment Type-7-Basic of the present invention. Embodiment Type-7-Basic performs the cleaning with original water mixed with a detergent, and has a function of the water-draining alarm. In this embodiment, the user has to pull off the plug of the bathtub manually to drain out the water.

The present system 1 structurally includes a bathtub 100, a plurality of peripheral pipes and a plurality of peripheral electronically controlled devices. In particular, the present system 1 structurally includes a bathtub 100 which includes a water-draining port 103, a suction port 105 and a water-jet port 106; a water-draining pipe 120 connected to the water-draining port 103; a suction pipe 310 connected between a pump 300 and the suction port 105; a pump pipe 320 connected between the pump 300 and the water-jet port 106; a detergent pipe 150 connected between a detergent container with a detergent 500 and the suction pipe 310; a detergent valve VC installed on the detergent pipe 150; and a controller 400 (of which the electric connection will be discuss later).

Optionally, the present system 1 further includes a blower pipe 210 connected between a blower 200 and an air-jet port 104 of the bathtub.

Optionally, the present system 1 further includes an alarm device, preferably using the panel 410 directly, which provides a sound or an image to notify a user to drain out the water from the bathtub 100 manually when the detergent cleaning stage is complete.

Here, the controller 400 is used to control the aforementioned peripheral electronically controlled devices, which is electrically connected to the blower 200, the pump 300, the alarm device 410 and the detergent valve VC, and configured to:

In a detergent cleaning stage:

Turn on the pump 300 for a preset time interval, and then turn off the pump 300; open the detergent valve VC to allow the detergent to enter the suction pipe 310 from the detergent container 500, being mixed with a circulating water, flowing into the bathtub 100 through the pump pipe 320 and the water-jet port 106; close the detergent valve VC; turn on the pump 300 to circulate the water in the bathtub 100 to clean the suction pipe 310 and the pump pipe 320; turn on and control the blower 200 to perform an intermittent operation to clean the blower pipe 210, and drain out the water after the cleaning is complete; wherein the detergent adding is performed at least one time.

Optionally, if the detergent stage is performed more than one time, the detergent is added at least once in the previous few times.

Figure 10:
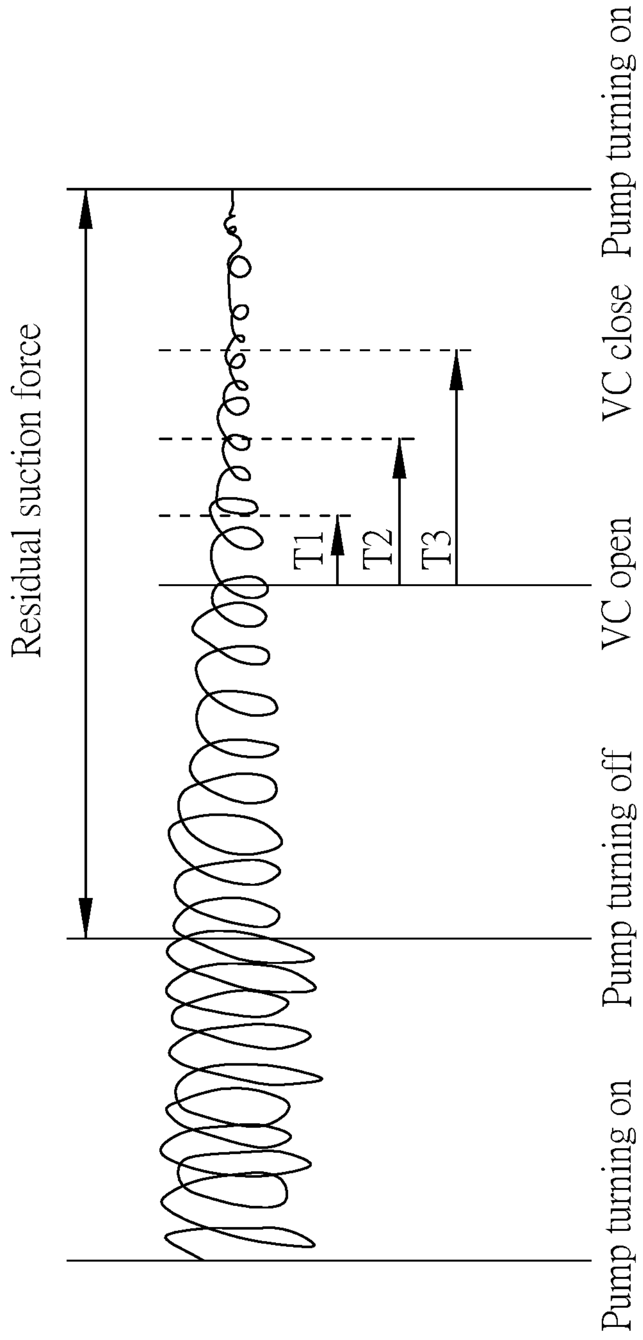
FIG. 10 shows that the detergent is added into the suction pipe by the residual suction force provided by the pump in the present invention.

FIG. 10 shows that the detergent is added into the suction pipe 310 by the residual suction force provided by the pump 300. As shown in FIG. 10 in the present invention, in the "pump turning on" stage, the strength of the suction force is larger. In the "pump turning off" stage, the strength of the residual suction force decease gradually, and at this time, the detergent valve VC may be open to allow the detergent to enter the suction pipe 310 from the detergent container 500. Time intervals T1, T2 and T3 represent the three different opening times when the detergent valve VC is open, by which the output amount of the detergent can be adjusted. The detergent is preferably to be add in the "pump turning off" stage, in order to avoid the detergent suddenly running off due to strong suction force provided by the pump.

Embodiment Type-7-Complete

FIG. 11 shows the automatic pipe clean system for massage bath equipment 1 according to Embodiment Type-7-Complete of the present invention. The main difference between Embodiments Type-7-Complete and Type-7-Basic is the presence of the relevant devices for automatic water-draining and the removal of the alarm device. Embodiment Type-7-Complete performs the cleaning with original water mixed with a detergent, and has a function of automatic water-draining.

In this embodiment, in addition to the devices in embodiment Type-7-Basic, the present system 1 further includes a water-draining valve VO installed on the water-draining pipe 120 and electrically connected to the controller 400; and a water level sensor 107 arranged in the bathtub 100 and electrically connected to the controller 400.

In this embodiment, the controller is configured to:

In a water-draining stage after the detergent cleaning stage:

Detect the water level of the bathtub 100 by the water level sensor 107; and determine: if the bathtub 100 has water, then open the water-draining valve VO to allow the water-draining pipe to drain out the water from the bathtub 100.

In a drying stage after the water-draining stage:

Turn on the pump 300 to allow the water to drain out from the suction pipe 310 and the pump pipe 320; and turn on the blower 200, to blow dry the blower pipe 210; and turn off the pump 300 and the blower 200.

Embodiment Type-8

FIG. 12 shows the automatic pipe clean system for massage bath equipment 1 according to Embodiment Type-8 of the present invention. The main difference between Embodiments Type-8 and Type-7-Complete is the presence of the relevant devices for strengthened cleaning the blower pipe 210. Embodiment Type-8 performs the cleaning with original water mixed with a detergent, and has a function of strengthening the internal cleaning of the blower pipe especially.

In this embodiment, in addition to the devices in embodiment Type-7-Basic and Complete, the present system 1 further includes a blower-pipe-branch 140 connected between the blower pipe 210 and the water-filling pipe 110; a blower-pipe valve VA installed on the blower-pipe-branch 140 and electrically connected to the controller 400.

In this embodiment, and the controller 400 is configured to:

In new water flushing stage after the detergent cleaning stage and the water-draining stage:

Turn on and control the blower 200 to perform an intermittent operation; open the water-draining valve VO, intermittently open the blower-pipe valve VA to allow the water to enter the blower pipe 210 from the blower-pipe-branch 140; close the water-draining valve VO and the blower-pipe valve VA; wherein the new water flushing stage is performed at least one time.

Embodiment Type-9

FIG. 13 shows the automatic pipe clean system for massage bath equipment 1 according to Embodiment Type-9 of the present invention. Embodiment Type-9 has functions of automatic detergent adding for and controlling the internal strengthened cleaning of the blower pipe and automatic water-draining.

The present system 1 structurally includes a bathtub 100, a plurality of peripheral pipes and a plurality of peripheral electronically controlled devices. In particular, the present system 1 includes a bathtub 100 which includes a water-draining port 103, an air-jet port 104, a suction port 105 and a water-jet port 106; a water-filling pipe 110 which supplies water to the bathtub 100; a water-draining pipe 120 connected to the water-draining port 103; a blower pipe 210 connected between a blower 200 and the air-jet port 104; a suction pipe 310 connected between a pump 300 and the suction port 105; a pump pipe 320 connected between the pump 300 and the water-jet port 106; an automatic water-filling pipe 130 connected to a blower-pipe-branch 140 from the water-filling pipe 110 through a water-filling valve VI and including an upstream node N3 and a downstream node N4 both downstream of the water-filling valve VI, the blower-pipe-branch 140 connected between the blower pipe 210 and the downstream node N4 of the automatic water-filling pipe 130; a blower-pipe valve VA installed on the blower-pipe-branch 140; a detergent pipe 150 connected between a detergent container 500 and the upstream node N3 of the automatic water-filling pipe 130; a detergent valve VC installed on the detergent pipe 150; a water-draining valve VO installed on the water-draining pipe 120; a water level sensor 107 arranged in the bathtub 100; and a controller 400, electrically connected to the water level sensor 107, the water-filling valve VI, the detergent valve VC, the blower-pipe valve VA and the water-draining valve VO.

Here, the controller 400 is used to control the aforementioned peripheral electronically controlled devices.

In so-called a "blower-pipe water-filling with detergent" operation, the controller 400 is configured to:

In a detergent stage:

Open the blower-pipe valve VA and the water-filling valve VI to allow water to enter the blower-pipe-branch 140; open the detergent valve VC to allow the detergent from the detergent container 500 to enter the automatic water-filling pipe 130 through the detergent pipe 150, being mixed with the water; close the water-filling valve VI, the blower-pipe valve VA and the detergent valve VC; wherein the detergent stage is performed at least one time.

In so-called an "original water type" operation, the controller 400 is configured to: if the detergent stage is performed more than one time, the detergent is added at least once in the previous few times; while in the following cleaning stage, the bathtub 100 has original water.

In so-called a "new water type" operation, the controller 400 is configured to: before the cleaning stage: detect a water level of the bathtub 100 by the water level sensor 107; determine: if the water level is lower than a normal level, then open the water-filling valve VI and the blower-pipe valve VA to allow the automatic water-filling pipe 130 to supply water to the bathtub through the blower-pipe-branch 140; if the water level is equal to or higher than the normal level, then close the water-filling valve VI and the blower-pipe valve VA to stop the automatic water-filling pipe 130 from supplying water to the bathtub 100; wherein if the detergent stage is performed more than one time, the detergent is added at least once in the previous few times.

In a cleaning stage:

Turn on the blower 200 to perform an intermittent operation; open the blower-pipe valve VA and the water-filling valve VI to allow the water mixed with the detergent pass and clean the blower-pipe-branch 140 and the blower pipe 210, being mixed with the water in the bathtub 100; close the water-filling valve VI; turn on the pump 300 to allow the water mixed with the detergent pass and clean the suction pipe 310 and the pump pipe 320; turn off the blower 200 and the pump 300; open the water-draining valve VO to allow the water-draining pipe to drain out the water from the bathtub 100; close the water-draining valve VO.

In a new water flushing stage:

Open the water-filling valve VI and the blower-pipe valve VA to allow the automatic water-filling pipe 130 to supply water to the bathtub 100 through the blower-pipe-branch 140; detect a water level of the bathtub 100 by the water level sensor 107, determine: if the water level is equal to or higher than a normal level, then close the water-filling valve VI and the blower-pipe valve VA to stop the automatic water-filling pipe 130 from supplying water to the bathtub 100; turn on the pump 300 to circulate the water in the bathtub; turn on the blower 200 to perform an intermittent operation; turn off the pump 300 and the blower 200; open the water-draining valve VO to allow the water-draining pipe to drain out the water from the bathtub 100; and close the water-draining valve VO.

In a drying stage:

Turn on the pump 300 to allow the water to drain out from the suction pipe 310 and the pump pipe 320, turn on the blower 200 to blow dry the blower pipe 210; and turn off the pump 300 and the blower 200.

Therefore, the functions and the valves in the aforementioned embodiments can be arranged in Table 1.

TABLE 1

| Embodiment | Function(s) | VI | VC | VA | VJ | VO |
|---|---|---|---|---|---|---|
| Type-1 | automatic water-filling, controlling the internal cleaning of the pump pipe, the suction pipe and the blower pipe, and automatic water-draining | ○ | X | X | X | ○ |
| Type-2 | automatic detergent adding with water-filling, controlling the internal cleaning of the pump pipe, the suction pipe and the blower pipe, and automatic water-draining | ○ | ○ | X | X | ○ |
| Type-3 | automatic detergent adding with water-filling, controlling the internal cleaning of the blower pipe, the suction pipe and the pump pipe, and automatic water-draining | ○ | ○ | ○ | X | ○ |
| Type-4 | automatic detergent adding for and controlling the internal cleaning of the pump pipe, the suction pipe and the blower pipe | ○ | ○ | ○ | ○ | X |
| Type-5 | completely automatic (automatic detergent adding for and controlling the internal cleaning of the pump pipe, the suction pipe | ○ | ○ | ○ | ○ | ○ |

TABLE 1-continued

| Embodiment | Function(s) | VI | VC | VA | VJ | VO |
|---|---|---|---|---|---|---|
| | and blower pipe, and automatic water-draining) | | | | | |
| Type 6-1 | automatic detergent adding for and controlling the internal cleaning of the blower pipe, the suction pipe and the pump pipe | ○ | ○ | ○ | X | X |
| Type 6-2 | automatic detergent adding for and controlling the internal cleaning of the blower pipe, the suction pipe and the pump pipe, and automatic water-draining | ○ | ○ | ○ | X | ○ |
| Type-7 Basic | original water mixed with a detergent, controlling the internal strengthened cleaning of the blower pipe, and water-draining alarm | X | ○ | X | X | X |
| Type-7 Complete | original water mixed with a detergent, controlling the internal strengthened cleaning of the blower pipe, and automatic water-draining | X | ○ | X | X | ○ |
| Type-8 | original water mixed with a detergent and controlling the internal strengthened cleaning of the blower pipe | X | ○ | ○ | X | ○ |
| Type-9 | automatic detergent adding for and controlling the internal strengthened cleaning of the blower pipe and automatic water-draining | ○ | ○ | ○ | X | ○ |

For the valves VI, VC, VA, VJ and VO, "0" means that the embodiment has the valve(s), and "X" means that the embodiment does not have the valve(s).

Embodiments Type-1, Type-2, Type-3, Type-4, Type-5, Type-6-1 and Type-6-2 can be the new water type. Embodiments Type-7-Basic, Type-7-Complete and Type-8 can be the original water type. Embodiment Type-9 can be the mix type.

In light of above, the present invention has conceive various cleaning ways for the basic pipe(s) of the massage bathtub, including the original water type, the new water type and the mix type, categorized by the water sources. The cleaning can also be performed by the water-filling type or the water-spray type, categorized by the water routes, flushing by new water, and drying by the blower and the pump. According to these types, the operations of the pipes, their valves, the blower and the pump can be determined.

Therefore, the present invention makes it possible to automatically clean the massage bathtub. It saves time and labor, and can clean the deep part of the pipes and, of course, clean the water-draining port, the air-jet port, the suction port and the water-jet port of the bathtub which is connected to the tubes, and thus avoid their blocking, also improve the health and the safety for the user. It has significant effects.

Although the present invention has been explained in relation to its preferred embodiment, it is to be understood that many other possible modifications and variations can be made without departing from the spirit and scope of the invention as hereinafter claimed.

What is claimed is:

1. An automatic pipe clean system for massage bath equipment, comprising:

a bathtub which includes a water-draining port, a suction port, a water-jet port, and a water level sensor arranged in the bathtub;

a water-filling pipe which supplies water to the bathtub;

a water-draining pipe connected to the water-draining port;

a water-draining valve installed on the water-draining pipe;

a suction pipe connected between a pump and the suction port;

a pump pipe connected between the pump and the water-jet port;

a blower pipe connected between a blower and an air-jet port of the bathtub;

an automatic water-filling pipe connected between the water-filling pipe and a water-filling port of the bathtub, and automatically supplies water for cleaning;

a water-filling valve arranged in the automatic water-filling pipe; and a controller electrically connected to the pump, the blower, the water-draining valve, the water level sensor, and the water-filling valve; the controller being configured to:

in a cleaning function:

turn on the pump to allow the water to pass and clean the suction pipe and the pump pipe;

turn on and control the blower to perform an intermittent operation to clean the blower pipe, wherein the intermittent operation is an alternate operation of turning on and turning off the blower and/or the pump;

in a water-draining function:

detect the water level of the bathtub by the water level sensor; and determine: if the bathtub has water, then open the water-draining valve to allow the water to drain out from the bathtub through the water-draining pipe; if the bathtub has no water, then close the water-draining valve to stop the water from draining out from the bathtub through the water-draining pipe;

in a drying function:

turn on the pump to allow the water to drain out from the suction pipe and the pump pipe;

turn on the blower to blow dry the blower pipe; and turn off the blower and the pump.

2. The automatic pipe clean system for massage bath equipment as claimed in claim 1, wherein in the cleaning function, the controller is configured to control the pump to perform an intermittent operation.

3. The automatic pipe clean system for massage bath equipment as claimed in claim 1, wherein the water-draining function is an early water-draining function before the water-filling function, or a late water-draining function after the cleaning function;

wherein the controller is configured to:

in a water-filling function:

detect a water level in the bathtub by the water level sensor; and determine: if the water level is lower than a normal level, then open the water-filling valve to allow the automatic water-filling pipe to supply water to the bathtub; if the water level is equal to or higher than the normal level, then close the water-filling valve to stop the automatic water-filling pipe from supplying water to the bathtub;

in a detergent function:

mix the water in the bathtub with a detergent;

in a new water flushing function after the late water-draining function after the cleaning function:

repeat the water-filling function, the cleaning function and the late water-draining function, while no detergent function is required in the new water flushing function.

4. The automatic pipe clean system for massage bath equipment as claimed in claim 3, wherein the automatic water-filling pipe includes a first node, the first node is downstream of the water-filling valve;

wherein the automatic pipe clean system for massage bath equipment further comprises:

a detergent pipe connected between a detergent container with a detergent and the first node of the automatic water-filling pipe; and a detergent valve installed on the detergent pipe and electrically connected to the controller;

wherein the water-filling port is located on one lateral surface of the bathtub, or connected onto the suction pipe near the suction port, or connected onto the blower pipe near the air-jet port.

5. The automatic pipe clean system for massage bath equipment as claimed in claim 4, wherein the controller is configured to:

in a detergent function:

open the water-filling valve and the detergent valve to allow the detergent to enter the automatic water-filling pipe from the detergent container through the detergent pipe, being mixed with the water; and close the water-filling valve and the detergent valve;

wherein the detergent function is performed at least one time;

in a water-filling function:

detect a water level in the bathtub by the water level sensor; and determine: if the water level is lower than a normal level, then open the water-filling valve to allow the automatic water-filling pipe to supply water to the bathtub; if the water level is equal to or higher than the normal level, then close the water-filling valve to stop the automatic water-filling pipe from supplying water to the bathtub;

in a new water flushing function after the late water-draining function after the cleaning function:

repeat the water-filling function, the cleaning function and the late water-draining function, while no detergent function is required in the new water flushing function;

wherein the water-filling function and the detergent function are performed between the early water-draining function and the cleaning function.

6. The automatic pipe clean system for massage bath equipment as claimed in claim 5, wherein if the detergent function is performed more than one time, the detergent is added at least once in the previous few times.

7. The automatic pipe clean system for massage bath equipment as claimed in claim 4, further comprising a blower-pipe valve and a blower-pipe-branch, wherein the automatic water-filling pipe further includes a second node, the second node is downstream of the first node, the blower-pipe-branch is connected between the blower pipe and the second node of the automatic water-filling pipe, the blower-pipe valve is installed on the blower-pipe-branch and electrically connected to the controller.

8. The automatic pipe clean system for massage bath equipment as claimed in claim 7, wherein the controller is configured to:

in a detergent function:

open the blower-pipe valve, the water-filling valve and the detergent valve to allow the detergent to enter the automatic water-filling pipe from the detergent container through the detergent pipe, being mixed with the water, flowing into the blower pipe and the bathtub; and close the blower-pipe valve, the water-filling valve and the detergent valve;

wherein the detergent function is performed at least one time;

in a water-filling function:

detect a water level in the bathtub by the water level sensor; and determine: if the water level is lower than a normal level, then open the blower-pipe valve and the water-filling valve to allow water to enter the automatic water-filling pipe and the blower pipe and then into the bathtub; if the water level is equal to or higher than the normal level, then close the blower-pipe valve and the water-filling valve to stop the automatic water-filling pipe from supplying water to the bathtub;

in a new water flushing function after the late water-draining function after the cleaning function:

repeat the water-filling function, the cleaning function and the late water-draining function, while no detergent function is required in the new water flushing function;

wherein the water-filling function and the detergent function are performed between the early water-draining function and the cleaning function.

9. The automatic pipe clean system for massage bath equipment as claimed in claim 8, wherein if the detergent function is performed more than one time, the detergent is added at least once in the previous few times.

10. An automatic pipe clean system for massage bath equipment, comprising:

a bathtub which includes a water-draining port, a suction port and a water-jet port;

a water-filling pipe which supplies water to the bathtub;

a water-draining pipe connected to the water-draining port;

a suction pipe connected between a pump and the suction port;

a pump pipe connected between the pump and the water-jet port;

a blower pipe connected between a blower and an air-jet port of the bathtub;

an automatic water-filling pipe which automatically supplies water for cleaning;

a water-filling valve arranged in the automatic water-filling pipe, wherein the automatic water-filling pipe is connected to a suction-pipe-branch from the water-filling pipe through the water-filling valve, and includes an upstream node and a downstream node, the upstream node and the downstream node are downstream of the water-filling valve, the suction-pipe-branch connected between the suction pipe and one terminal of the automatic water-filling pipe near the downstream node;

a suction-pipe valve installed on the suction-pipe-branch and near the suction pipe;

a blower-pipe-branch connected between the blower pipe and the downstream node of the automatic water-filling pipe;

a blower-pipe valve installed on the blower-pipe-branch; and a controller electrically connected to the pump, the blower, the suction-pipe valve, the blower-pipe valve, and the water-filling valve; the controller being configured to:

in a cleaning function:

turn on the pump to allow the water to pass and clean the suction pipe and the pump pipe;

turn on and control the pump and the blower to perform an intermittent operation to clean the suction pipe, the pump pipe, and/or the blower pipe, wherein the intermittent operation is an alternate operation of turning on and turning off the blower and/or the pump;

in a drying function:

turn on the pump to allow the water to drain out from the suction pipe and the pump pipe; and turn on the blower to blow dry the blower pipe; and turn off the blower and the pump.

11. The automatic pipe clean system for massage bath equipment as claimed in claim 10, further comprising:

a detergent pipe connected between a detergent container with a detergent and the upstream node of the automatic water-filling pipe; and a detergent valve installed on the detergent pipe.

12. The automatic pipe clean system for massage bath equipment as claimed in claim 11, wherein the controller is further electrically connected to the detergent valve and the controller is configured to:

in a detergent function:

control the pump to perform an intermittent operation;

open the blower-pipe valve, the suction-pipe valve, the water-filling valve and the detergent valve to allow the detergent to enter the automatic water-filling pipe from the detergent container through the detergent pipe, being mixed with the water, flowing into the blower pipe and the suction pipe; and close the blower-pipe valve, the suction-pipe valve, the water-filling valve and the detergent valve;

wherein the detergent function is performed at least one time;

in a cleaning function:

open the blower-pipe valve, the suction-pipe valve and the water-filling valve to allow the water mixed with the detergent to enter the blower pipe, the suction pipe and the pump pipe; and turn off the pump, the blower, and close the blower-pipe valve, the suction-pipe valve and the water-filling valve;

in a new water flushing function after the cleaning function:

repeat the cleaning function, while no detergent function is required in the new water flushing function.

13. The automatic pipe clean system for massage bath equipment as claimed in claim 12, wherein if the detergent function is performed more than one time, the detergent is added at least once in the previous few times.

14. An automatic pipe clean system for massage bath equipment, comprising:

a bathtub which includes a water-draining port, a suction port and a water-jet port;

a water-filling pipe which supplies water to the bathtub;

a water-draining pipe connected to the water-draining port;

a suction pipe connected between a pump and the suction port;

a pump pipe connected between the pump and the water-jet port;

a blower pipe connected between a blower and an air-jet port of the bathtub;

an automatic water-filling pipe which automatically supplies water for cleaning;

a water-filling valve arranged in the automatic water-filling pipe; and a controller electrically connected to the pump, the blower, and the water-filling valve; the controller being configured to:

in a cleaning function:

turn on the pump to allow the water to pass and clean the suction pipe and the pump pipe; and turn on and control the blower and the pump to perform an intermittent operation to clean the blower pipe, the suction pipe, and the pump pipe, wherein the intermittent operation is an alternate operation of turning on and turning off the blower and/or the pump;

in a drying function:

turn on the pump to allow the water to drain out from the suction pipe and the pump pipe;

turn on the blower to blow dry the blower pipe; and turn off the pump and the blower.

15. The automatic pipe clean system for massage bath equipment as claimed in claim 14, wherein the automatic water-filling pipe is connected to a suction-pipe-branch from the water-filling pipe through the water-filling valve, and includes an upstream node and a downstream node, the upstream node and the downstream node are downstream of water-filling valve, the suction-pipe-branch connected between the suction pipe and one terminal of the automatic water-filling pipe near the downstream node.

16. The automatic pipe clean system for massage bath equipment as claimed in claim 15, further comprising:

a detergent pipe connected between a detergent container with a detergent and the upstream node of the automatic water-filling pipe;

a detergent valve installed on the detergent pipe;

a blower-pipe-branch connected between the blower pipe and the downstream node of the automatic water-filling pipe; and a blower-pipe valve installed on the blower-pipe-branch.

17. The automatic pipe clean system for massage bath equipment as claimed in claim 16, wherein the controller electrically connected to the detergent valve and the blower-pipe valve, the controller being configured to:

in a detergent function:

open the water-filling valve, the detergent valve and the blower-pipe valve to allow the detergent to enter the automatic water-filling pipe through the detergent pipe, being mixed with the water, flowing into the blower pipe and the suction pipe; and close the water-filling valve, the detergent valve and the blower-pipe valve;

wherein the detergent function is performed at least one time; and in the cleaning function:

open the water-filling valve and the blower-pipe valve;

control the blower and the pump to perform the intermittent operation to allow the water mixed with the detergent to flow into both the blower-pipe-branch and the suction-pipe-branch to clean the blower pipe, the suction pipe and the pump pipe; and turn off the blower and the pump, and close the water-filling valve and the blower-pipe valve.

18. The automatic pipe clean system for massage bath equipment as claimed in claim 17, wherein if the detergent function is performed more than one time, the detergent is added at least once in the previous few times.

19. The automatic pipe clean system for massage bath equipment as claimed in claim 18, further comprising:

a water-draining valve installed on the water-draining pipe and electrically connected to the controller; and a water level sensor arranged in the bathtub and electrically connected to the controller.

20. The automatic pipe clean system for massage bath equipment as claimed in claim 19, wherein the controller is configured to:

in a water-draining function before the cleaning function:

detect the water level in the bathtub by the water level sensor; and determine: if the bathtub has water, then open the water-draining valve, to allow the water to drain out from the bathtub through the water-draining pipe; if the bathtub has no water, then close the water-draining valve to stop the water from draining out from the bathtub through the water-draining pipe;

in the cleaning function:

open the water-draining valve simultaneously with the opening the water-filling valve and the blower-pipe valve;

after the cleaning function:

close the water-draining valve simultaneously with or after the closing of the water-filling valve and the blower-pipe valve.

* * * * *